United States Patent
Koehler et al.

(10) Patent No.: US 11,188,368 B2
(45) Date of Patent: Nov. 30, 2021

(54) ASYNCHRONOUS WORKLOAD MIGRATION CONTROL

(71) Applicant: Nutanix, Inc., San Jose, CA (US)

(72) Inventors: Heiko Friedrich Koehler, San Jose, CA (US); Sameer Narkhede, Sunnyvale, CA (US); Venkatesh Kothakota, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 83 days.

(21) Appl. No.: 16/177,142

(22) Filed: Oct. 31, 2018

(65) Prior Publication Data

US 2020/0133706 A1   Apr. 30, 2020

(51) Int. Cl.
    G06F 9/455   (2018.01)

(52) U.S. Cl.
    CPC .. G06F 9/45558 (2013.01); *G06F 2009/4557* (2013.01); *G06F 2009/45575* (2013.01)

(58) Field of Classification Search
    CPC ......... G06F 2009/4557; G06F 9/45558; G06F 9/45533; G06F 9/4856; G06F 9/5088; G06F 2009/45575
    See application file for complete search history.

(56) References Cited

U.S. PATENT DOCUMENTS

| | | |
|---|---|---|
| 7,962,587 B2 | 6/2011 | Tripathi |
| 8,397,236 B2 | 3/2013 | Gibson |
| 8,549,518 B1 | 10/2013 | Aron et al. |
| RE44,686 E | 12/2013 | Keshav et al. |
| 8,601,473 B1 | 12/2013 | Aron et al. |
| RE44,818 E | 3/2014 | Jnagal et al. |
| 8,789,043 B2 * | 7/2014 | Biran ............... G06F 9/45558 718/1 |

(Continued)

FOREIGN PATENT DOCUMENTS

CN   107301088 A   10/2017

OTHER PUBLICATIONS

Non-Final Office Action dated Apr. 2, 2020 for related U.S. Appl. No. 16/176,653.

(Continued)

*Primary Examiner* — Dong U Kim
(74) *Attorney, Agent, or Firm* — Vista IP Law Group, LLP

(57) ABSTRACT

Systems and methods for workload migration control. Migration control operations commence upon identifying a workload comprising two or more virtual machines to be migrated from a source computing environment to a target computing environment. A migration process initiates migration of the two or more virtual machines to the target computing environment. After the migration process has begun, a user identifies a prioritized virtual machine from among the two or more virtual machines that are in the process of being migrated. In response to receiving the user input, a migration manager suspends progression of selected virtual machines while accelerating progression of the migration of the prioritized virtual machine that is not suspended. The migration of the re-prioritized virtual machine preferentially receives computing resources. After migration of the re-prioritized virtual machine that is not suspended has completed, then the migration manager releases the suspension of the suspended virtual machines to continue migration.

23 Claims, 18 Drawing Sheets

(56) References Cited

U.S. PATENT DOCUMENTS

| | | | |
|---|---|---|---|
| 8,850,130 | B1 | 9/2014 | Aron et al. |
| 9,286,127 | B2 | 3/2016 | Guan et al. |
| 9,348,655 | B1 | 5/2016 | Tsirkin et al. |
| 9,600,331 | B1 | 3/2017 | Birkestrand et al. |
| 9,619,258 | B2 | 4/2017 | Abali et al. |
| 9,619,259 | B2 | 4/2017 | Abali et al. |
| 9,632,815 | B2* | 4/2017 | Decusatis ........... G06F 9/45558 |
| 9,672,054 | B1* | 6/2017 | Gupta ................. G06F 9/45533 |
| 9,760,392 | B1 | 9/2017 | Dantkale et al. |
| 9,772,866 | B1 | 9/2017 | Aron et al. |
| 9,942,323 | B2 | 4/2018 | Vasetsky et al. |
| 10,552,200 | B2 | 2/2020 | Franciosi et al. |
| 2008/0222375 | A1 | 9/2008 | Kotsovinos et al. |
| 2009/0007106 | A1 | 1/2009 | Araujo, Jr. et al. |
| 2010/0228913 | A1 | 9/2010 | Czezatke et al. |
| 2011/0066597 | A1 | 3/2011 | Mashtizadeh et al. |
| 2011/0197039 | A1 | 8/2011 | Green et al. |
| 2011/0264788 | A1 | 10/2011 | Costa |
| 2011/0320556 | A1 | 12/2011 | Reuther |
| 2012/0017031 | A1 | 1/2012 | Mashtizadeh et al. |
| 2012/0017114 | A1 | 1/2012 | Timashev et al. |
| 2012/0096458 | A1 | 4/2012 | Huang et al. |
| 2012/0185848 | A1* | 7/2012 | Devarakonda ........ G06F 9/5077 718/1 |
| 2012/0221710 | A1 | 8/2012 | Tsirkin et al. |
| 2012/0254131 | A1* | 10/2012 | Al Kiswany ......... G06F 16/188 707/692 |
| 2013/0132057 | A1 | 5/2013 | Deng et al. |
| 2013/0185719 | A1 | 7/2013 | Kar et al. |
| 2014/0040343 | A1* | 2/2014 | Nickolov ............ H04L 67/1029 709/201 |
| 2015/0052516 | A1 | 2/2015 | French et al. |
| 2015/0149999 | A1 | 5/2015 | Ramanathan et al. |
| 2015/0212844 | A1 | 7/2015 | Tsirkin et al. |
| 2015/0324217 | A1 | 11/2015 | Shilmover et al. |
| 2015/0381589 | A1 | 12/2015 | Tarasuk-Levin et al. |
| 2016/0011900 | A1 | 1/2016 | Reddy et al. |
| 2016/0077845 | A1 | 3/2016 | Earl et al. |
| 2016/0269313 | A1 | 9/2016 | Brooker et al. |
| 2017/0177399 | A1 | 6/2017 | Abali et al. |
| 2017/0192812 | A1 | 7/2017 | Hong et al. |
| 2017/0212784 | A1 | 7/2017 | Johnsen et al. |
| 2018/0046492 | A1 | 2/2018 | Bernal et al. |
| 2018/0129523 | A1* | 5/2018 | Bryant ................ G06F 9/45558 |
| 2018/0203715 | A1 | 7/2018 | Granado |
| 2018/0357092 | A1 | 12/2018 | Kaul |
| 2019/0044832 | A1 | 2/2019 | Deval et al. |
| 2019/0065229 | A1 | 2/2019 | Tsirkin et al. |
| 2019/0109799 | A1* | 4/2019 | Nipane ................... H04L 45/64 |
| 2019/0188036 | A1* | 6/2019 | Yamamoto ............ G06F 9/4881 |
| 2019/0265995 | A1 | 8/2019 | Franciosi |
| 2019/0286475 | A1 | 9/2019 | Mani |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication late based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication late based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Narander, Kumar, et al. "Token-based Predictive Scheduling of Tasks in Cloud Data-centers" May 2015, from www.isca.in, vol. 4(IVC-2015), p. 29-33.
VMWARE vCENTER Server, Datasheet, from http://www.vmware.com/products, p. 1-4.
VMWARE, "Migrate a Powered-On Virtual Machine with vMotion in the vSphere Client", fromhttps://pubs.vmware.com/vsphere-51/topic/com.vmware.vsphere.vcenterhost.doc.
Abdul-Rahman et al., "Live Migration-based Resource Managers for Virtualized Environments: A Survey", Cloud Computing 2010 : The First International Conference on Cloud Cenlputing, GRIDS, and Virtualization, (Jan. 2010), from https://pdfs.semanticscholar.org/b8ee/7f862568880aac2ab426653d006f30fcc7c4.pdf.
Red Hat, "Red Hat Virtualization 4.0 Virtual Machine Management Guide", Last updated Feb. 7, 2018.
Cano, I. et al., "Curator: Self-Managing Storage for Enterprise Clusters", *14th USENIX Symposium on Networked Systems Design and Implementation, NSDI '17*, (Mar. 27, 2017).
Bangjie et al., "Priority-Based Live Migration of Virtual Machine", Conference Paper, *DATICS-GPC* 2013: *Design, Analysis and Tools for Integrated Circuits and Systems*, (May 2013).
Final Office Action dated Nov. 17, 2020 for related U.S. Appl. No. 16/176,653.
Notice of Allowance dated Mar. 22, 2021 for related U.S. Appl. No. 16/176,653.
Kulkarni, R. A. et al., "Fuzzy based task prioritization and VM Migration of Deadline Constrained tasks in Cloud Systems", Proceedings of the International Conference on Inventive Computing and Informatics (ICICI 2017), (Nov. 2017).
Red Hat, "6.13. Migrating Virtual Machines Between Hosts", Virtual Machine Management Guide, Red Hat Virtualization Documentation Team, (Aug. 13, 2016), date retrieved from google.
Biddle, J. et al., "8.11.6. Setting Migration Priority", Administration Guide, Red Hat Enterprise Virtualization 3.1, Edition 1, (Nov. 9, 2012), date retrieved from google.
"Understanding Virtual Machine Priority and Preemption Behavior", Working Hard in IT, blog, (Feb. 11, 2013).
Finn, a "You Pause a Clustered Hyper-V Host and Low Priority VMs are Quick Migrated!", Aidan Finn, IT Pro, (Nov. 5, 2012).
Jiang, B. et al., "Priority-Based Live Migration of Virtual Machine", Conference paper, International Conference on Grid and Pervasive Computing, (May 2013).
Zhang, Z. et al., "A Scheduling Method for Multiple Virtual Machines Migration in Cloud", 10th International Conference on Network and Parallel Computing (NPC), (Sep. 2013).
Karamanolis, C. et al., "Virtual SAN Architecture Deep Dive", VMware, (Nov. 9, 2014), date retrieve from google.
VMware, "Administering VMware Virtual SAN: Virtual SAN 6.1", VMware, (Dec. 31, 2015).
VMware, "VMware VMotion", Product Datasheet, VMware, (Jun. 13, 2006), date retrieve from google.
VMware, "Resource Management with VMware DRS", VMware, (Revision Nov. 22, 2006).
VMware, "Scenarios: VMware Validated Design 4.0", VMware Validated Design for IT Automating IT 4.0, VMware, (Dec. 15, 2016).
VMware, "Architecture and Design: VMware Validated Design 4.0", VMware Validated Design for Micro-Segmentation 4.0, VMware, (Dec. 15, 2016).

(56) References Cited

OTHER PUBLICATIONS

VMware, "Planning and Preparation: VMware Validated Design 4.0", VMware Validated Design for Micro-Segmentation 4.0, VMware, (Dec. 15, 2016).
VMware, "Backup and Restore: VMware Validated Design 4.0", VMware Validated Design for Software-Defined Data Center 4.0, VMware, (Dec. 15, 2016).
VMware, "Certificate Replacement: VMware Validated Design 4.0", VMware Validated Design for Software-Defined Data Center 4.0 VMware, (Dec. 15, 2016).
VMware, "Introducing VMware Validated Designs for Software-Defined Data Center: VMware Validated Design 4.0", VMware Validated Design for Software-Defined Data Center 4.0, VMware, (Dec. 15, 2016).
VMware, "Migration: VMware Validated Design 4.0", VMware Validated Design for Software-Defined Data Center 4.0, VMware, (Dec. 15, 2016).
VMware, "Monitoring and Alerting: VMware Validated Design 4.0", VMware Validated Design for Software-Defined Data Center 4.0, VMware, (Dec. 15, 2016).
VMware, "Operational Verification: VMware Validated Design 4.0", VMware Validated Design for Software-Defined Data Center 4.0, VMware, (Dec. 15, 2016).
VMware, "Deployment for Region A: VMware Validated Design 4.0", VMware Validated Design for Software-Defined Data Center 4.0, VMware, (Modified on Sep. 26, 2017).
VMware, "Deployment for Region B: VMware Validated Design 4.0", VMware Validated Design for Software-Defined Data Center 4.0, VMware, (Modified on Sep. 26, 2017).
VMware, "Architecture and Design: VMware Validated Design 4.0", VMware Validated Design for Remote Office Branch Office 4.0, VMware, (Dec. 15, 2016).
VMware, "Certificate Replacement: VMware Validated Design 4.0", VMware Validated Design for Remote Office Branch Office 4.0, VMware, (Dec. 15, 2016).
VMware, "Deployment: VMware Validated Design 4.0", VMware Validated Design for Remote Office Branch Office 4.0, VMware, (Modified on Sep. 26, 2017).
VMware, "Planning and Preparation: VMware Validated Design 4.0", VMware Validated Design for Remote Office Branch Office 4.0, VMware, (Dec. 15, 2016).
VMware, "Site Protection and Recovery: VMware Validated Design 4.0", VMware Validated Design for Software-Defined Data Center 4.0, VMware, (Dec. 15, 2016).
VMware, "Upgrade: VMware Validated Design 4.0", VMware Validated Design for Software-Defined Data Center 4.0, VMware, (Dec. 15, 2016).
VMware, "Introducing VMware Validated Design Use Cases: VMware Validated Design 4.0", VMware, (Dec. 15, 2016).
Rivera R et al., "Understanding Data Locality in VMware Virtual SAN", Technical Marketing Documentation, VMware, (Jul. 2014).
Notice of Allowance dated Jul. 23, 2021 for related U.S. Appl. No. 16/176,653.

\* cited by examiner

ASYNCHRONOUS WORKLOAD MIGRATION CONTROL

CROSS REFERENCE TO RELATED APPLICATIONS

The present application is related to co-pending U.S. patent application Ser. No. 16/176,653 titled "VIRTUAL MACHINE MIGRATION TASK MANAGEMENT", filed on even date herewith, which is hereby incorporated by reference in its entirety.

FIELD

This disclosure relates to virtualized computing systems, and more particularly to techniques for asynchronously re-prioritized workload migration control.

BACKGROUND

Virtualized computing technology has evolved to a point at which there are many computing service providers that a particular customer (e.g., enterprise) might select to satisfy its computing requirements. The computing services offered by the service providers often differ in terms of their pricing and capabilities, as well as in terms of the technologies (e.g., hypervisors, node appliances, storage facilities, etc.) implemented in the virtualized computing systems and/or environments that deliver the computing services. For example, one service provider might offer low-cost computing overflow capabilities (e.g., for on-demand augmentation of an on-premises computing system), while a different service provider might offer highly-scalable, high-performance computing capabilities (e.g., for hosting thousands of virtual machines). The offerings provided by existing and new entrants into the computing services ecosystem are constantly changing.

In response to such new and changing computing service offerings, customers often want to move (e.g., migrate) from one service provider (e.g., providing services at a "source" computing environment) to another service provider (e.g., providing services at a "target" computing environment). To perform such migrations, an administrator of a customer will identify certain workloads to migrate to the target environment and initiate the migration. A set of virtualized entities (e.g., virtual machines, virtual disks, executable containers, etc.) that underlie the identified workloads, along with any data associated with the virtualized entities, will then be migrated to the target environment.

In many cases, the datasets corresponding to the workloads and/or virtualized entities (VEs) selected for migration are large, but nevertheless need to be moved to the target environment before the respective VEs that rely on the datasets can be available for use at the target environment. As such, long latencies between an initiation of the migration and an actual cutover to the migrated VEs are often observed. As an example, a particular VM from a set of VMs being migrated might have only a small amount of underlying data and metadata, but still must contend for computing and networking resources demanded by the other VMs being migrated. In cases when the other VMs have a large amount of underlying data (e.g., terabytes of data), the incurred latency for migrating a particular VM can be very long, even when the particular VM has only a small amount of underlying data. Furthermore, when migrating from a source environment having a first hypervisor to a target environment having a second hypervisor that is incompatible with the first hypervisor, the VMs (or other types of VEs) at the source environment need to be powered down for a period of time before the respective VMs at the target environment can be powered up. An ability to manage (i.e., minimize) workload downtime is critical for both the service provider and its customers.

In consideration of the foregoing aspects of workload migration, certain controls over the migration process are desired. For example, an administrator might determine that one of the VMs that is already in the process of being migrated needs to be-prioritized over the other VMs that are also in-process for migration. More specifically, an administrator might want to prioritize a VM that serves an "order processing" workload so that the VM completes its migration as soon as possible (e.g., even at the cost of delaying other VMs that are in the process of being migrated). Such prioritization might be desired for various reasons. As an example, the target environment might have certain capability and/or cost improvements that are not present in the source environment. As another example, a prioritization of the migration (e.g., final cutover) of a VM might be desired so as to manage the timing and/or duration of the downtime of the VM when migrating between environments with heterogeneous hypervisors.

Unfortunately, there are no mechanisms to adjust the priority of a particular VM migration (e.g., to accelerate migration) once the migration has commenced. Specifically, legacy approaches to migrating VMs rely on establishing a respective priority for the VMs before commencing migration. Establishing the priorities of the VMs before commencement of the migration fails to consider desired adjustments to the priorities that might not be known until some (possibly long) time after the commencement of the migration. As such, a customer that initiates a migration of several VMs and later desires to have a particular VM immediately available for use at the target environment must endure some uncertain period of time before the particular VM is available for use in the new environment. Even worse, when migrating between environments involves migration of a VM from one hypervisor type to another hypervisor type, the VM would not be available in any environment during an uncertain period of time (e.g., downtime). What is needed is a way for a customer to control the priority of a particular VM so as to lessen latency-inducing effects of resource contention during concurrent migration of a group of VMs.

SUMMARY

The present disclosure describes techniques used in systems, methods, and in computer program products for workload migration control, which techniques advance the relevant technologies to address technological issues with legacy approaches. More specifically, the present disclosure describes techniques used in systems, methods, and in computer program products for virtual machine re-prioritization during workload migrations between computing environments. Certain embodiments are directed to technological solutions for modifying, in response to VM migration re-prioritization inputs, the in-process migration states of the virtual machines that correspond to a particular workload to facilitate re-prioritized migration of the virtual machines.

The disclosed embodiments modify and improve over legacy approaches. In particular, the herein-disclosed techniques provide technical solutions that address the technical problems attendant to controlling the re-prioritization of the migration of a set of virtual machines even after the migration of the virtual machines has commenced. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. For example, when performing computer operations that address the various technical problems underlying controlling the re-prioritization of the migration of a set of virtual machines even after the migration of the virtual machines has commenced, it happens that both memory usage and CPU cycles demanded are significantly reduced as compared to the memory usage and CPU cycles that would be needed but for practice of the herein-disclosed techniques. For example, if not for the herein-disclosed techniques, a virtual machine that is intended to be accelerated would thrash in and out of a suspended state, all the while consuming resources inefficiently, and possibly for a long time, and possibly spending long periods of time in suspension while the other VMs of a lower priority are being migrated.

Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of cloud systems as well as advances in various technical fields related to hyperconverged computing platform management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
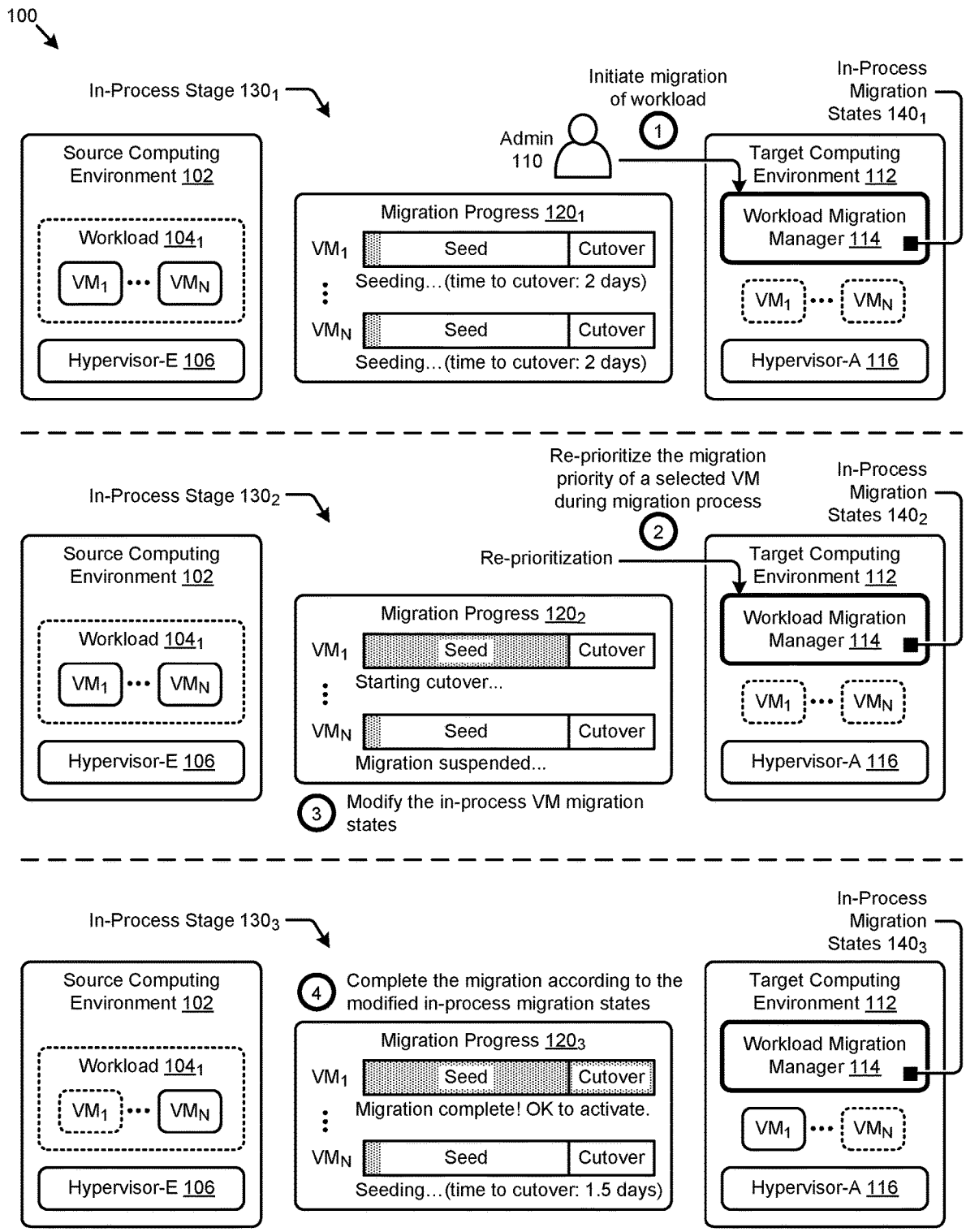
FIG. 1 illustrates a computing environment in which embodiments of the present disclosure can be implemented.

Embodiments in accordance with the present disclosure address the problem of controlling the re-prioritization of the migration of a set of virtual machines even after the migration of the virtual machines has commenced. Some embodiments are directed to approaches for modifying, in response to VM migration re-prioritization inputs, the in-process migration states of the virtual machines that correspond to a particular workload to facilitate re-prioritized migration of the virtual machines. The accompanying figures and discussions herein present example environments, systems, methods, and computer program products for virtual machine re-prioritization during workload migrations between computing environments.

Overview

Disclosed herein are techniques for modifying, in response to virtual machine re-prioritization inputs, the in-process migration states of virtualized entities to facilitate re-prioritized migration of a particular one or more virtualized entities of a workload. In certain embodiments, a source computing environment that hosts the workload is identified. A target computing environment to which the workload is to be migrated is also identified. The workload is selected for migration from the source computing environment to the target computing environment. The execution of a migration plan to carry out the migration of the workload and its underlying virtualized entities (e.g., virtual machines, virtual disks, executable containers, etc.) is invoked. The migration plan might be determined based on certain information that is available prior to invoking execution, such as then-current resource availability, then-current attributes of the virtualized entities, and/or then-current user prioritization specifications. During the execution of the migration plan, the virtualized entities transition through various in-process migration states.

In response to receiving one or more user inputs while the migration is in-process, one or more of the in-process migration states of the virtualized entities are modified. For example, a user input to re-prioritize the completion of the migration of a first VM might re-prioritize pursuit of transitioning the in-process migration state of the re-prioritized VM from a "ready-to-cutover" state to a "cutover-in-progress" state, while transitioning another VM from a "data-seeding" state to a "suspended" state so as to release computing resources (e.g., CPU resources, networking resources, storage resources, etc.) for use by the re-prioritized VM. The execution of the migration will continue until completion, subject to any modifications to the in-process states that have been incurred. In certain embodiments, the source computing environment and the target computing environment comprise respective hypervisors that are of different types. In certain embodiments, a specific virtual machine and its virtualized entities, rather than a workload, is selected for migration to the target computing environment.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to modifying, in response to VM migration re-prioritization inputs, the in-process migration states of the virtual machines that correspond to a particular workload. Specifically, the figure presents a logical depiction of how the herein disclosed techniques can be implemented in a computing environment to asynchronously control the in-process migration of workloads between computing environments.

The depiction of FIG. 1 illustrates a source computing environment 102 that hosts one or more virtualized entities that interact with a hypervisor-E 106 to facilitate execution of one or more workloads. Virtualized entities are entities that emulate various underlying shared computing resources (e.g., of a physical computing node) to facilitate their usage as autonomous computing components. For example, such virtualized entities might include virtual machines (VMs), virtual disks (vDisks), virtual network interface cards (vNICs), executable containers (ECs), and/or other entities. Implementation of some virtualized entities (e.g., VMs) is facilitated by a hypervisor (e.g., hypervisor-E 106). Certain collections of virtualized entities can be hierarchically associated. For example, a particular VM might be associated with one or more vNICs and one or more vDisks. Virtualized entities might also be associated by the workload or workloads they facilitate. For example, a first set of VMs and associated vDisks might be instantiated to run a virtual desktop infrastructure (VDI) workload for a certain department (e.g., finance, accounting, engineering, etc.) of an enterprise, and a second set of VMs and associated vDisks might be instantiated to run an SQL server workload of an enterprise.

As earlier mentioned, a need might arise to move (e.g., migrate) workloads and/or virtualized entities from the source computing environment 102 to another computing environment, such as a target computing environment 112 as shown in FIG. 1. To perform such migrations, an administrator might identify certain workloads to migrate to the target environment. As a representative example, a workload 1041 that comprises a set of VMs (e.g., $VM_1, \ldots, VM_N$) might be selected by an admin 110 to migrate from source computing environment 102 to target computing environment 112. In many cases, the datasets corresponding to the workloads (e.g., workload 1041) and/or virtualized entities (e.g., $VM_1, \ldots, VM_N$) selected for migration are large, which can result in long latencies between an initiation of the migration and an actual cutover to the target computing environment. Moreover, when migrating from a source computing environment having a first hypervisor (e.g., hypervisor-E 106) to a target computing environment having a second hypervisor (e.g., hypervisor-A 116) that is incompatible with the first hypervisor, the VMs (or other types of VEs) at the source computing environment need to be powered down for a period of time before the respective VMs at the target computing environment can be powered up. The aforementioned incompatibilities can arise for many reasons. For example, data structures used in a first hypervisor from a first hypervisor vendor (e.g., at a source computing environment) might not be the same or even similar to the data structures used in a second hypervisor from a second hypervisor vendor (e.g., at a target computing environment). The representation of a virtualized entity (e.g., storage devices, network interfaces, etc.) might be different between hypervisor vendors; moreover, such differences can lead to incompatibilities that can be resolved by power-down, power-up and re-initialization of a migrated virtual machine.

In order to reduce latency between an initiation of the migration and an actual cutover to the target computing environment, certain controls over the migration process can be exerted while the migration is in process. Specifically, certain states of a set of in-process migration states 1401 can be controlled based on an asynchronously received VM re-prioritization inputs.

The herein disclosed techniques facilitate such in-process migration control at least in part by implementing a workload migration manager 114 to modify, in response to VM migration re-prioritization inputs, the in-process migration states of the virtualized entities (e.g., VMs) associated with a migration process. As used herein, a migration process is a set of tasks and/or operations that are executed to carry out transitioning of a workload and/or set of virtualized entities from one computing environment to another computing environment. In some cases, the tasks and/or operations might be invoked by one or more programming instructions (e.g., scripts). The in-process migration states are the set of possible states each of the virtualized entities might achieve during a migration process. Modifying an in-process migration state of a particular virtualized entity will perform a state transition for the virtualized entity from a first in-process migration state to a second in-process migration state.

As shown in an in-process stage $130_1$ of FIG. 1, a migration progress $120_1$ for $VM_1$ through $VM_N$ might be achieved in response to admin 110 initiating a migration of workload 1041 from source computing environment 102 to target computing environment 112 (operation 1). As illustrated in migration progress $120_1$, while $VM_1$ is transferring its seed data, it is in contention for resources that are consumed by $VM_N$ and other VMs that remain in their respective "seeding" process. This situation of contention can span a long period of time, in particular when there is a large amount of seeding data to be transferred by one or more of the other VMs. The workload migration manager 114 can intervene, for example, by accelerating processing of migration tasks for $VM_1$ as a consequence of suspending the migration of other VMs that are using large amount of resources, thus making available resources scarce.

The information presented in migration progress $120_1$ indicates resource scarcity by indicating that the expected time to complete the seeding for $VM_N$ is "2 days". This means that the migration of $VM_N$ would be making resources scarce for that full period. Thus, since $VM_1$ and $VM_N$ (and any other VMs being migrated) are contending for a finite amount of computing and networking resources to complete their respective migrations, $VM_1$ might experience a long latency (e.g., up to 2 days or possibly even longer) before reaching the point of cutover to the target computing environment.

Some approaches for managing groups of VMs to be migrated rely on some sort of a priori knowledge that a particular VM is to be prioritized over the other VMs in the group. Approaches that rely on a priori knowledge that a particular VM is to be prioritized over other VMs in a migration group fail to consider that such a priori knowledge might not always be available. Strictly as examples, the total time for migration (e.g., overall time to cutover) of a group of VMs might not be known until the entire group has been scheduled and started, such that the availability of network bandwidth with respect to the amount of data to be migrated has been compared (e.g., to form an estimated time of completion) and/or measured (e.g., to assess actual availability of the network bandwidth under the then-current conditions).

Accordingly, even after the migration of a group of VMs has commenced and proceeded into the shown in-process stage $130_2$, a re-prioritization of one or more workloads can serve to remediate effects of such potentially long latencies to cutover of some workloads on the migration latency of other workloads. Re-prioritization inputs (e.g., specification of one or more workloads and/or one or more virtual machines) are delivered to the workload migration manager 114 to re-prioritize (e.g., accelerate) performance of a selected virtual machine migration (operation 2). The workload migration manager 114 responds to the re-prioritization inputs (e.g., from an admin 110 or from a computing task comprising a re-prioritization tool, agent or facility) by modifying the in-process migration states of $VM_1, \ldots, VM_N$ and/or other virtualized entities associated with the subject migration (operation 3). Specifically, and as shown in migration process 1202, the migration of $VM_N$ is suspended until the cutover of $VM_1$ has started. A set of in-process migration states 1402 at workload migration manager 114 can further reflect such state modifications by indicating that $VM_N$ is in a "suspended" state and $VM_1$ is entering or is in a "cutover" state.

As used herein the "cutover" state refers to the portion of a virtualized entity migration when a series of actions are taken by or on behalf of a virtualized entity at its source environment so as to advance the virtualized entity toward a condition for bring up in the target environment. In many embodiments, the subject virtualized entity is closed or halted or otherwise brought into quiescence before being brought up in the target environment. As such, during at least a portion of the duration that a virtualized entity is in a cutover state, and for a duration thereafter, the virtualized entity is not operational.

As is depicted by the shown in-process stage 1303, the workload migration manager 114 then completes the migration of workload 1041 in accordance with the foregoing modifications, and/or any other modifications, to the in-process migration states (operation 4). Specifically, and as shown in migration process 1203, when the cutover of $VM_1$ is completed, the seeding of $VM_N$ is resumed. In this case, a set of in-process migration states 1403 at workload migration manager 114 might indicate that $VM_1$ has transitioned to an "activate" state and $VM_N$ has transitioned back to a "seed" state.

The "seed" state corresponds to performance of acts for transferring an entire vDisk from the source computing environment to the target computing environment. For example, a single vDisk might correspond to a very large database, possibly terabytes in size. It can happen that transferring the entire vDisk of the seed vDisk can consume nearly all of the elapsed time and nearly all of the computing resources involved in the migration. As such, asynchronous in-process control of migration processes often involves managing transitions out of the seeding state so that computing resources that would otherwise be consumed while transferring the entire vDisk can be at least temporarily made available to other migration tasks pertaining to other VMs such that they are preferentially allowed to progress through their migration processes.

One embodiment of techniques for asynchronous in-process control of such migration processes is disclosed in further detail as follows.

Figure 2:
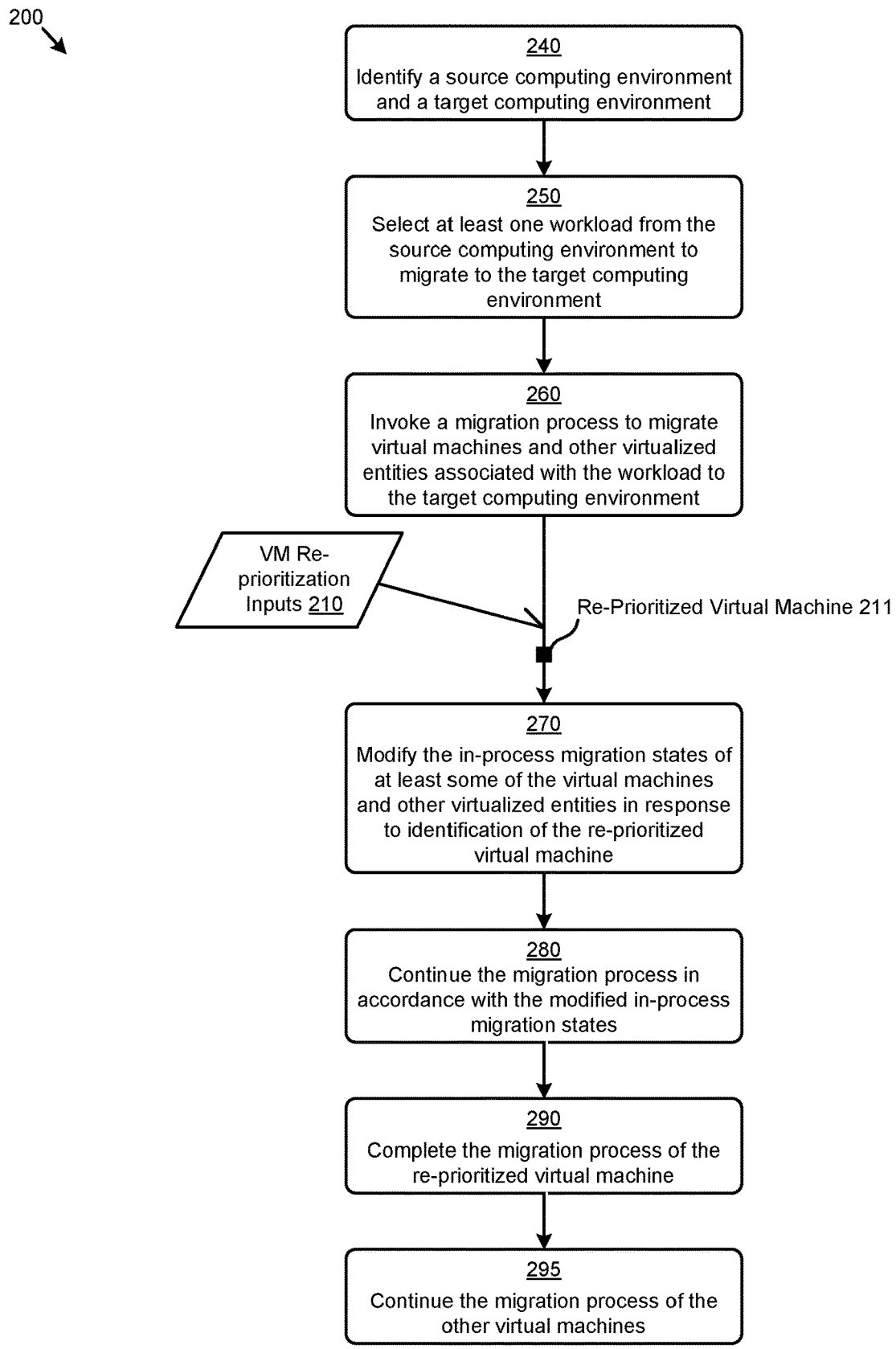
FIG. 2 depicts an asynchronous workload migration control technique as implemented in systems that facilitate virtual machine re-prioritization during workload migrations between computing environments, according to an embodiment.

FIG. 2 depicts an asynchronous workload migration control technique 200 as implemented in systems that facilitate virtual machine re-prioritization during workload migrations between computing environments. As an option, one or more variations of asynchronous workload migration control technique 200 or any aspect thereof may be implemented in the context of the architecture and functionality of the embodiments described herein. The asynchronous workload migration control technique 200 or any aspect thereof may be implemented in any environment.

FIG. 2 illustrates one aspect pertaining to modifying, in response to VM migration re-prioritization inputs, the in-process migration states of the virtual machines that correspond to a particular workload. Specifically, the figure is presented to illustrate one embodiment of certain steps and/or operations that facilitate asynchronous in-process control of migration processes pertaining to migrating workloads and/or virtualized entities from one computing environment to another computing environment.

The asynchronous workload migration control technique 200 can commence by identifying a source computing environment and a target computing environment (step 240). The two environments might be distinguished by various aspects pertaining to each environment, such as a service provider, a service model, a hypervisor type, a hardware deployment model (e.g., on-premises, cloud-based, etc.), and/or other aspects of an environment. At least one workload operating at the source computing environment is selected for migration to the target computing environment (step 250). As an example, an SQL server workload comprising several VMs and associated vDisks might be selected to migrate from an on-premise cluster with a first hypervisor to a cloud-based virtualization environment with a second hypervisor. A migration process is invoked to migrate the virtualized entities (e.g., the several VMs and associated vDisks) associated with the workload (e.g., SQL server) to the target computing environment (step 260).

In response to receiving one or more re-prioritization inputs to identify a re-prioritized virtual machine 211, at least one of the in-process migration states of the virtualized entities (e.g., the de-prioritized virtual machines other than the re-prioritized virtual machine) are modified (step 270) so as to free up computing resources that can be used by the re-prioritized virtual machine. For example, one or more occurrences of virtual machine re-prioritization inputs 210 might invoke a state transition associated with a respective one or more virtualized entities to a dormant or suspended state. The virtual machine re-prioritization inputs 210 might be user inputs received at a graphical user interface (e.g., by clicking a button, selecting a dropdown item, etc.), or at a command line interface (e.g., by entering a call to a script, etc.), or at another mechanism for receiving input from a user (e.g., an administrator), and/or the virtual machine re-prioritization inputs might derive from a migration monitoring process that monitors progression of migration when there are multiple workloads to be migrated. The migration of the re-prioritized virtual machine progresses until such time as the de-prioritized virtual machines other than the re-prioritized virtual machine are released from corresponding dormant or suspended states. The migration process associated with the virtualized entities continues in accordance with the modified instances of the in-process migration states (step 280). After the re-prioritized virtual machine 211 has been migrated (step 290), the virtual machines that were suspended are released from suspension, and migration of the other virtual machines continues to completion (step 295).

Various embodiment of systems, data flows, and data structures for implementing the asynchronous workload migration control technique 200 and/or other herein disclosed techniques are disclosed as follows.

Figure 3:
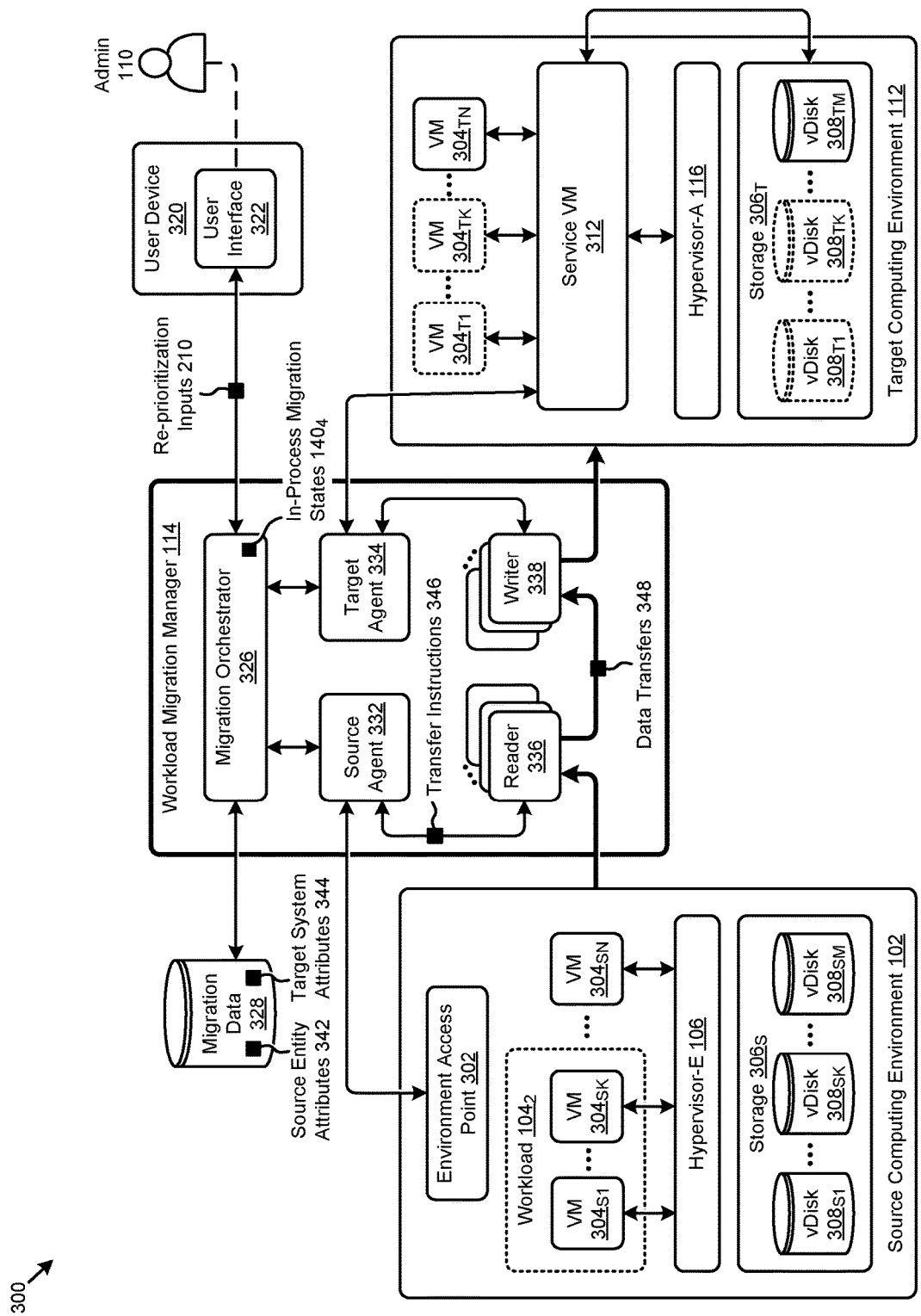
FIG. 3 is a block diagram of a system that implements virtual machine re-prioritization during workload migrations between computing environments, according to an embodiment.

FIG. 3 is a block diagram of a system 300 that implements virtual machine re-prioritization during workload migrations between computing environments. As an option, one or more variations of system 300 or any aspect thereof may be implemented in the context of the architecture and functionality of the embodiments described herein. The system 300 or any aspect thereof may be implemented in any environment.

FIG. 3 illustrates one aspect pertaining to modifying, in response to VM migration re-prioritization inputs, the in-process migration states of the virtual machines that correspond to a particular workload. Specifically, the figure is being presented to show one embodiment of certain representative components and associated data flows that describes how the herein disclosed techniques might be implemented in modern computing environments (e.g., virtualization computing environments). The components and data flows shown in FIG. 3 present one partitioning and its associated data manipulation approach. The specific example shown is purely exemplary, and other subsystems, data structures, and/or partitioning are reasonable.

As shown in FIG. 3, the system 300 comprises the source computing environment 102 and the target computing environment 112 earlier described. Each of the computing environments might comprise one or more nodes that have multiple tiers of storage areas (e.g., storage $306_S$ and storage $306_T$). Each node can be associated with one server or appliance, multiple servers or appliances, or portions of a server or appliance. The nodes can be associated (e.g., logically and/or physically) with one or more computing clusters. The multiple tiers of storage of the storage areas can include instances of local storage and/or instances of networked storage. The local storage can be within or directly attached to a server and/or appliance associated with the nodes. Such local storage can include solid state drives (SSDs), hard disk drives (HDDs), and/or other storage devices. The networked storage can include storage that is accessible through a network (e.g., a private network and/or a public network), such as a storage area network (SAN) or network attached storage (NAS), etc.

As shown, any of the nodes of source computing environment 102 or target computing environment 112 can implement one or more virtualized entities, such as virtual machines (e.g., VM $304_{S1}$, . . . , VM $304_{SK}$, . . . , VM $304_{SN}$, VM $304_{T1}$, . . . , VM $304_{TK}$, . . . , VM $304_{TN}$, and service VM 312), virtual disks (e.g., vDisk $308_{S1}$, . . . , vDisk $308_{SK}$, . . . , vDisk $308_{SM}$, vDisk $308_{T1}$, . . . , vDisk $308_{TK}$, . . . , vDisk $308_{TM}$), and/or executable containers. The VMs can be characterized as software-based computing "machines" implemented in a hypervisor-assisted virtualization environment that emulates the underlying computing resources (e.g., CPU, memory, etc.) of the nodes. For example, multiple VMs can operate on one physical machine (e.g., node host computer) running a single host operating system, while the VMs run multiple applications on various respective guest operating systems. Such flexibility can be facilitated at least in part by one of a variety of heterogeneous hypervisors (e.g., hypervisor-E 106, hypervisor-A 116, etc.), which hypervisors are logically located between the various guest operating systems of the VMs and the host operating system of the physical infrastructure (e.g., the nodes).

As an alternative, executable containers may be implemented at the nodes in an operating system-based virtualization environment or container virtualization environment. The executable containers are implemented at the nodes in an operating system virtualization environment or container virtualization environment. Executable containers comprise groups of processes and/or computing resources (e.g., memory, CPU, disk, etc.) that are isolated from the node host computer and other containers. Such executable containers directly interface with the kernel of the host operating system without, in most cases, a hypervisor layer. This lightweight implementation can facilitate efficient distribution of certain software components, such as applications or services (e.g., micro-services). Any node of system 300 can implement both a hypervisor-assisted virtualization environment and a container virtualization environment for various purposes.

Furthermore, any node in source computing environment 102 or target computing environment 112 can implement one or more virtualized controllers to facilitate, at least in part, access to storage facilities (e.g., storage pools, networked storage, etc.) by the VMs and/or executable containers operating at the nodes within the environments. As used in these embodiments, a virtualized controller is a collection of software instructions that serve to abstract details of underlying hardware and/or software components from one or more higher-level processing entities. A virtualized controller can be implemented as a virtual machine, as an executable container (e.g., a Docker container), or within a layer (e.g., such as a layer in a hypervisor). As can be observed in system 300, an instance of a virtual machine (e.g., service VM 312) at target computing environment 112 is used as a virtualized controller to manage storage and I/O (input/output or IO) operations (e.g., to and from storage 306T) at the nodes in the environment. A virtualized controller or virtualized server might be implemented at source computing environment 102 to serve as an environment access point 302. Such an access point will often manage information (e.g., metadata) about and access to the virtualized entities in the environment.

Varying architectures and/or configurations of the virtualized entities at source computing environment 102 and target computing environment 112 are facilitated by respective variations in the hypervisor type implemented in each environment. For example, hypervisor-E 106 implemented at the source computing environment 102 might correspond to software from a first hypervisor vendor, and hypervisor-A 116 implemented at the target computing environment 112 might correspond to a second hypervisor vendor. In the situation that the source computing environment 102 hosts a first hypervisor type and the target computing environment 112 hosts a different hypervisor type, the migration process may include a power down of a VM at the source computing environment before initiating a power up of the VM at the target computing environment.

As can be observed, to facilitate in-process control of workload migrations from source computing environment 102 to target computing environment 112, at least one instance of the workload migration manager 114 is implemented in a computer. In some cases, a configured instance of the workload migration manager 114 is implemented in service VM 312 at the target computing environment. In other architectures, a portion of workload migration manager 114 is implemented in the source computing environment, while another portion of workload migration manager 114 is implemented in the target computing environment. In still other architectures and/or partitionings, a complete instance of the workload migration manager is situated in the source computing environment, while another a complete instance of the workload migration manager is situated in the target computing environment.

A first complete instance can be configured to carry out operations that pertain to the source computing environment, while a second complete instance can be configured to carry out operations that pertain to the target computing environment. The determination as to how a particular complete instance of the workload migration manager can be made at invocation time, possibly using a command line parameter or other technique for providing configuration settings to a sequence of executable code (e.g., a process, or a task, or a job, or a thread, etc.). In some embodiments, all or portions of a workload migration manager can be implemented in a third computing environment that is accessible to components of the source computing environment as well as to components of the target computing environment.

A user (e.g., admin 110) can interact with a migration orchestrator 326 at the workload migration manager 114 through a user interface 322 presented at a user device 320. Specifically, admin 110 can access the user interface to invoke a migration process to migrate the workload $104_2$ from source computing environment 102 to target computing environment 112. As represented graphically in FIG. 3, the outcome of the migration process is a migration of the VMs (e.g., VM $304_{S1}$, ..., VM $304_{SK}$) and corresponding vDisks (e.g., vDisk $308_{S1}$, ..., vDisk $308_{SK}$) associated with workload $104_2$ to instances of VMs (e.g., VM $304_{T1}$, ..., VM $304_{TK}$) and corresponding vDisks (e.g., vDisk $308_{T1}$, ..., vDisk $308_{TK}$) at target computing environment 112.

To facilitate the foregoing migration process associated with workload $104_2$, a source agent 332 accesses the environment access point 302 at source computing environment 102 to collect instances of source entity attributes 342 pertaining to the migration process. For example, the source entity attributes 342 might describe the virtualized entities and underlying datasets associated with workload $104_2$. Such source entity attributes might be stored in a set of migration data 328 for access by migration orchestrator 326.

Certain instances of target system attributes 344 might also be stored in migration data 328. The target system attributes 344 might specify information (e.g., user credentials, IP addresses, etc.) to facilitate data transfers to the target computing environment 112. As shown, for example, such target system information might provision access to the service VM 312 at target computing environment 112 by a target agent 334 at workload migration manager 114. The service VM 312 may be configured to perform a wide range of tasks. Strictly as an illustrative example, a service VM can handle storage I/O (e.g., perform or route storage I/O requests to hypervisors and/or perform or route storage I/O requests to storage devices of a storage area). As another illustrative example, a service VM can handle certain migration tasks that are performed in conjunction with a hypervisor. As one specific example, a service VM can handle configuration and initialization of a hypervisor prior to power up of any VM that runs on top of a corresponding hypervisor. More particularly, various embodiments of a service VM can be configured as a storage controller that is used to manage all storage and I/O activities to and from all of the storage areas within the computing environment. In some computing environments multiple storage controllers coordinate among multiple nodes a computing cluster.

The service VMs are not formed as part of specific implementations of hypervisors; instead, the service VMs run as virtual machines above hypervisors, and the service VMs work together to form a distributed computing system that manages all storage resources, including any locally attached storage, any networked storage, and any cloud storage. Since the service VMs run above the hypervisors, this means that the current workload migration approach can be used and implemented within and/or between any virtual machine architecture, and/or using any hypervisor from any hypervisor vendor.

To carry out the migration process, migration orchestrator 326 interacts with source agent 332 to receive data from source computing environment 102 at one or more instances of a reader 336. The received data can comprise metadata and/or the underlying data (e.g., vDisk data) associated with the virtualized entities being migrated. Source agent 332 might employ certain data management techniques (e.g., change block tracking) to issue instances of transfer instructions 346 to the readers for receiving data from the source computing environment. Transfer instructions 346 and/or other information (e.g., instructions from target agent 334) facilitate a set of data transfers 348 from instances of reader 336 to one or more instances of a writer 338. In accordance with directives from target agent 334 and/or service VM 312, the writers then deliver the data to the target computing environment 112 to complete the migration. The in-process migration states 1404 associated the virtualized entities (e.g., VMs) are managed by migration orchestrator 326. For example, any modifications to the in-process migration states in response to virtual machine re-prioritization inputs 210 (e.g., from user interface 322) according to the herein disclosed techniques are managed at least in part by migration orchestrator 326. Further details pertaining to in-process migration states and management (e.g., control) of such states are disclosed herein (e.g., FIG. 7 and FIG. 8A through FIG. 8G).

The foregoing discussions include techniques for selecting a source computing environment and a target computing environment that can accommodate certain workload and/or virtualized entity migrations (e.g., step 240 of FIG. 2), which techniques are disclosed in further detail as follows.

Figure 4:
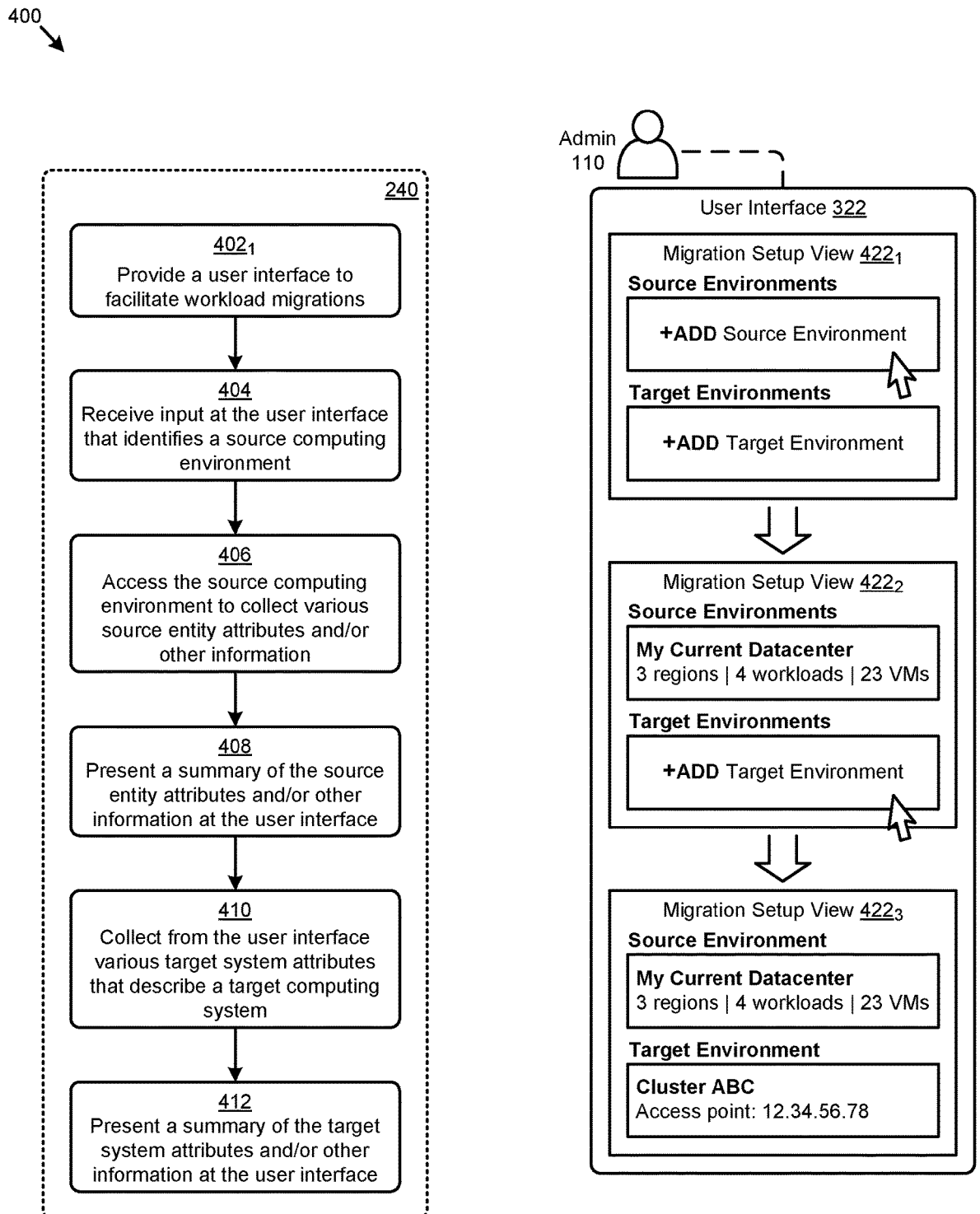
FIG. 4 presents a migration environment identification technique as implemented in systems that facilitate virtual machine re-prioritization during workload migrations between computing environments, according to an embodiment.

FIG. 4 presents a migration environment identification technique 400 as implemented in systems that facilitate virtual machine re-prioritization during workload migrations between computing environments. As an option, one or more variations of migration environment identification technique 400 or any aspect thereof may be implemented in the context of the architecture and functionality of the embodiments described herein. The migration environment identification technique 400 or any aspect thereof may be implemented in any environment.

FIG. 4 illustrates one aspect pertaining to modifying, in response to VM migration re-prioritization inputs, the in-process migration states of the virtual machines that correspond to a particular workload. Specifically, the figure is presented to illustrate one embodiment of certain steps and/or operations that facilitate selection of a source computing environment and a target computing environment for certain workload and/or virtualized entity migrations. A representative scenario is also shown in the figure to illustrate an example application and use of the migration environment identification technique 400.

The migration environment identification technique 400 can commence by providing a user interface to facilitate workload migrations (step $402_1$). As shown in the representative scenario, the provided user interface might be user interface 322 that is accessed by admin 110. Input is received at the user interface that identifies a source computing environment (step 404). As an example, a region (e.g., button) in a migration setup view $422_1$ at user interface 322 might be clicked to "ADD" a source computing environment. In this case, admin 110 might be presented with a list of computing environments that can be selected as source computing environments, and/or admin 110 might be presented with graphical components (e.g., text boxes, drop-down selections, etc.) to facilitate specification of a source computing environment.

The identified source computing environment is accessed to collect various source entity attributes and/or other information pertaining to the environment (step 406). For example, source entity attributes and/or other information pertaining to the environment might include regional boundaries and/or other geographic characteristics, number of workloads being hosted at the source site, number of VMs being subsumed by the workload, amount of data of the virtual disks of the VMs of the workload, etc.

A summary of the source entity attributes and/or other information are presented at the user interface (step 408). As can be observed in migration setup view $422_2$ at user interface 322, a source computing environment named "My Current Datacenter" might be identified and accessed to obtain attributes and/or information that characterize the environment as having "3 regions", "4 workloads", and "23 VMs".

Various target system attributes that describe a target computing system are also collected at the user interface (step 410). The target system attributes and/or other information are then summarized and presented at the user interface (step 412). In the representative scenario, a region (e.g., button) in migration setup view $422_2$ is selected to "ADD" a target computing environment, and certain information associated with the target computing environment (e.g., name of "Cluster ABC" and access point IP address of "12.34.56.78") are collected and presented in migration setup view $422_3$ at user interface 322. Other target system attributes might include user credentials for accessing the target system, an identifier for the storage container to receive the migrated data, and/or other attributes.

The foregoing discussions include techniques for selecting a workload to migrate from the source computing environment to the target computing environment (e.g., step 250 of FIG. 2), which techniques are disclosed in further detail as follows.

Figure 5:
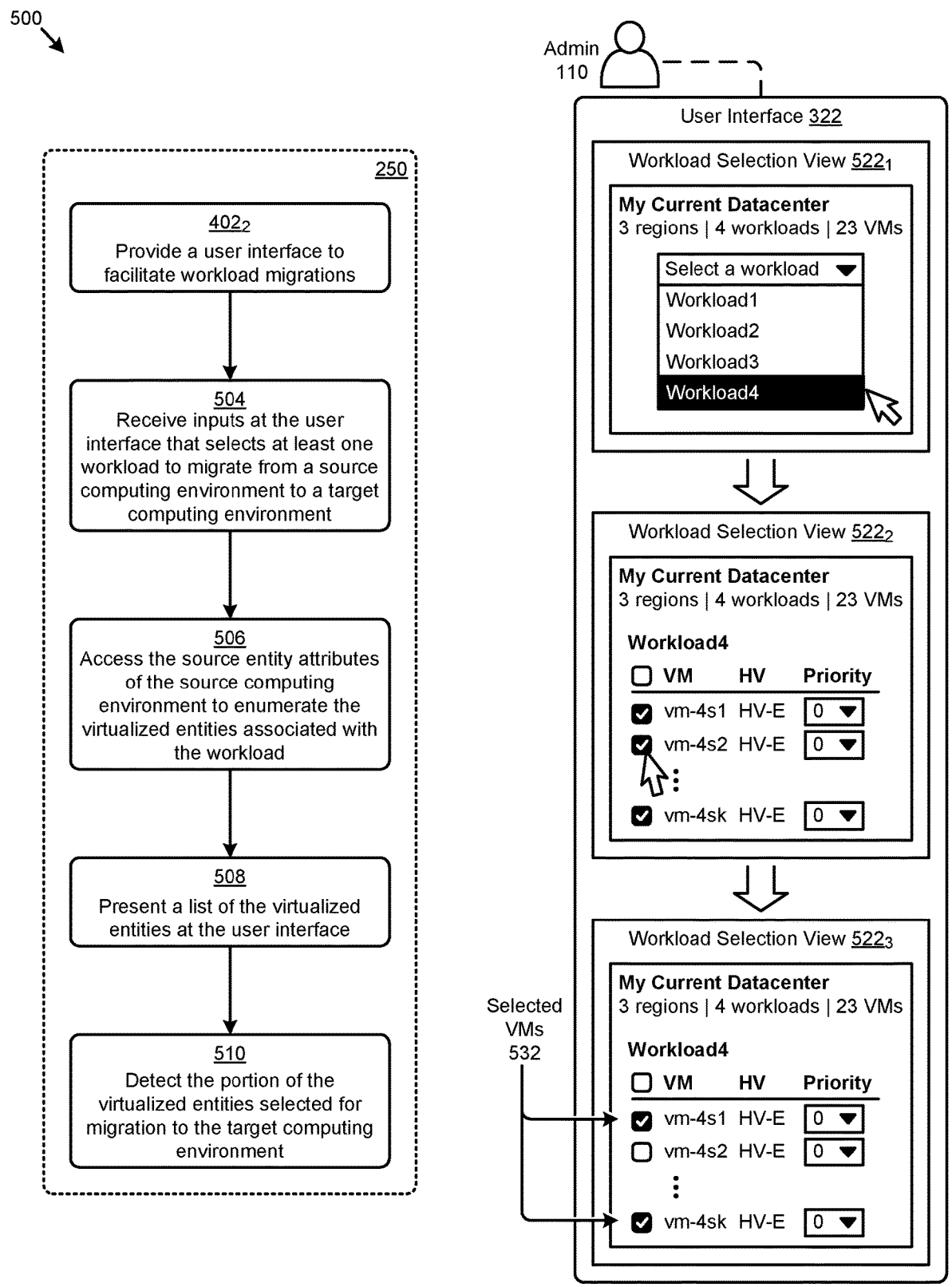
FIG. 5 presents a workload selection technique as implemented in systems that facilitate virtual machine re-prioritization during workload migrations between computing environments, according to an embodiment.

FIG. 5 presents a workload selection technique 500 as implemented in systems that facilitate virtual machine re-prioritization during workload migrations between computing environments. As an option, one or more variations of workload selection technique 500 or any aspect thereof may be implemented in the context of the architecture and functionality of the embodiments described herein. The workload selection technique 500 or any aspect thereof may be implemented in any environment.

FIG. 5 illustrates one aspect pertaining to modifying, in response to VM migration re-prioritization inputs, in-process migration states of the virtual machines that correspond to a particular workload to facilitate re-prioritized migration of the virtual machines. Specifically, the figure is presented to illustrate one embodiment of certain steps and/or operations that facilitate selection of a workload to migrate from a source computing environment to a target computing environment. A representative scenario is also shown in the figure to illustrate an example application and use of the workload selection technique 500.

The workload selection technique 500 can commence by providing a user interface to facilitate workload migrations (step $402_2$). As shown in the representative scenario, the provided user interface might be user interface 322 that is accessed by admin 110. Input is received at the user interface that selects at least one workload to migrate from a source computing environment to a target computing environment (step 504). As an example, a dropdown selector in a workload selection view $522_1$ at user interface 322 might be accessed to select "Workload4" from the four workloads at "My Current Datacenter". In some cases, the migration scope of a particular migration process might be defined by one or more regions, or one or more virtualized entities, rather than by one or more workloads.

Certain source entity attributes associated with the selected workload (e.g., "Workload4") are accessed to enumerate the virtualized entities associated with the selected workload (step 506). A list of the virtualized entities is then presented at the user interface (step 508). As can be observed in workload selection view $522_2$, the accessed source entity attributes indicate that "Workload4" comprises the shown plurality of VMs (e.g., VM "vm-4s1", VM "vm-4s2", . . . , VM "vm-4sk"). The hypervisor type (e.g., "HV-E") and initial priority (e.g., priority level "0") associated with the VMs are also presented in workload selection view $522_2$. The source entity attributes might further describe other attributes associated with the selected workload (e.g., or other migration scope), such as identifiers of any virtualized entities (e.g., vDisks) related to the VMs, status indicators of the VMs, or identifiers of the nodes hosting the VMs.

In some cases, merely a portion of the virtualized entities associated with the workload might be selected for migration. For example, admin 110 might want to downsize the number of VMs associated with a particular workload as part of the migration strategy. As such, the workload selection technique 500 will detect the portion of the virtualized entities that are selected for migration (step 510). Such selection might be facilitated at user interface 322, as indicated by the selected VMs 532 (e.g., comprising at least VM "vm-4s1" and VM "vm-4sk", but not VM "vm-4s2") in workload selection view $522_3$.

The foregoing discussions include techniques for invoking a migration process to migrate the selected portion of virtualized entities from the source computing environment to the target computing environment (e.g., step 260 of FIG. 2), which techniques are disclosed in further detail as follows.

Figure 6:
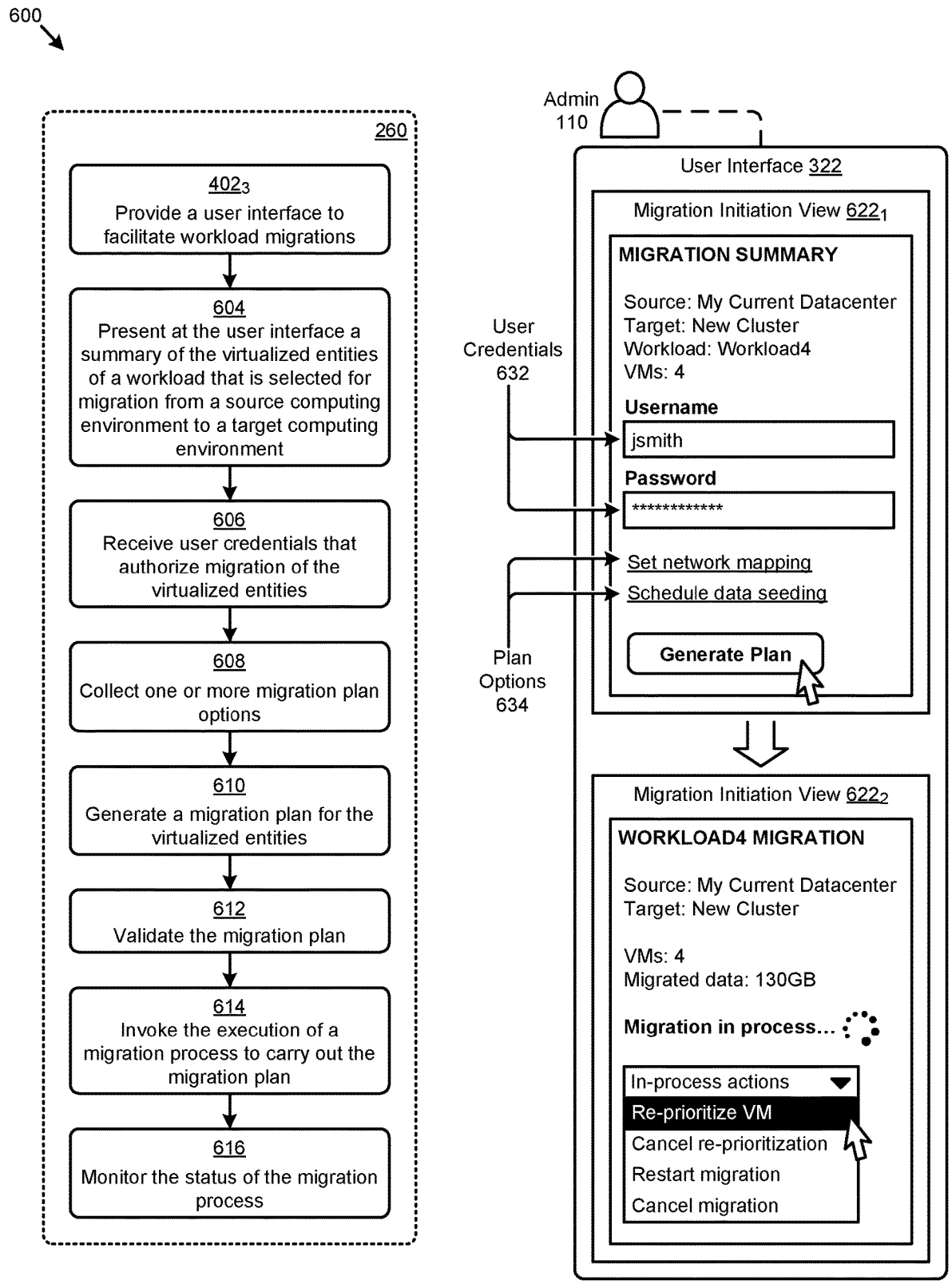
FIG. 6 depicts a workload migration initiation technique as implemented in systems that facilitate virtual machine re-prioritization during workload migrations between computing environments, according to an embodiment.

FIG. 6 depicts a workload migration initiation technique 600 as implemented in systems that facilitate virtual machine re-prioritization during workload migrations between computing environments. As an option, one or more variations of workload migration initiation technique 600 or any aspect thereof may be implemented in the context of the architecture and functionality of the embodiments described herein. The workload migration initiation technique 600 or any aspect thereof may be implemented in any environment.

FIG. 6 illustrates one aspect pertaining to modifying, in response to VM migration re-prioritization inputs, the in-process migration states of the virtual machines that correspond to a particular workload. Specifically, the figure is presented to illustrate one embodiment of certain steps and/or operations that facilitate specification of a migration plan and initiation of a migration process to carry out the migration plan. A representative scenario is also shown in the figure to illustrate an example application and use of the workload migration initiation technique 600.

The workload migration initiation technique 600 can commence by providing a user interface to facilitate workload migrations (step $402_3$). As shown in the representative scenario, the provided user interface might be user interface 322 that is accessed by admin 110. A summary is presented at the user interface of the virtualized entities of a workload that are selected for migration from a source computing environment to a target computing environment (step 604). As an example, a migration initiation view $622_1$ presents a migration summary associated with a workload "Workload4" from which four VMs are selected for migration from a source computing environment named "My Current Datacenter" to a target computing environment named "New Cluster". User credentials that authorize the aforementioned migration are received (step 606). For example, a set of user credentials 632 might be entered at user interface 322 as shown in migration initiation view $622_1$. Certain plan options might also be collected (step 608). As merely examples, hyperlinks to forms for specifying a set of plan options 634 (e.g., that "Set network mapping" between the source and target computing environments or "Schedule data seeding" start times) might be presented at user interface 322.

A migration plan for migrating the virtualized entities is then generated (e.g., by clicking a "Generate Plan" button) (step 610). As an example, the migration plan might comprise a set of scripts that are interpreted to execute the migration process that carries out the migration. The generated migration plan (e.g., the scripts) is then validated (step 612). When the migration plan is validated, a migration process to carry out the migration plan, and the underlying workload and/or virtualized entity migration, is invoked (step 614) and monitored (step 616). As an example, a migration initiation view $622_2$ indicates the migration is in process and has transferred 130 GB of data so far.

As also shown in migration initiation view $622_2$, a drop-down menu for invoking "In-process actions" is also presented to admin 110 at user interface 322. In this representative example, this dropdown can be used by admin 110 to invoke certain asynchronous in-process migration controls, such as controls to "Re-prioritize a VM", "Cancel re-prioritization", and/or perform other actions. According to the techniques disclosed herein, the foregoing in-process user inputs (e.g., from admin 110) can result in modifications to the in-process migration states of one or more of the virtualized entities being migrated (e.g., step 270 of FIG. 2), which in-process migration states are disclosed in further detail as follows.

Figure 7:
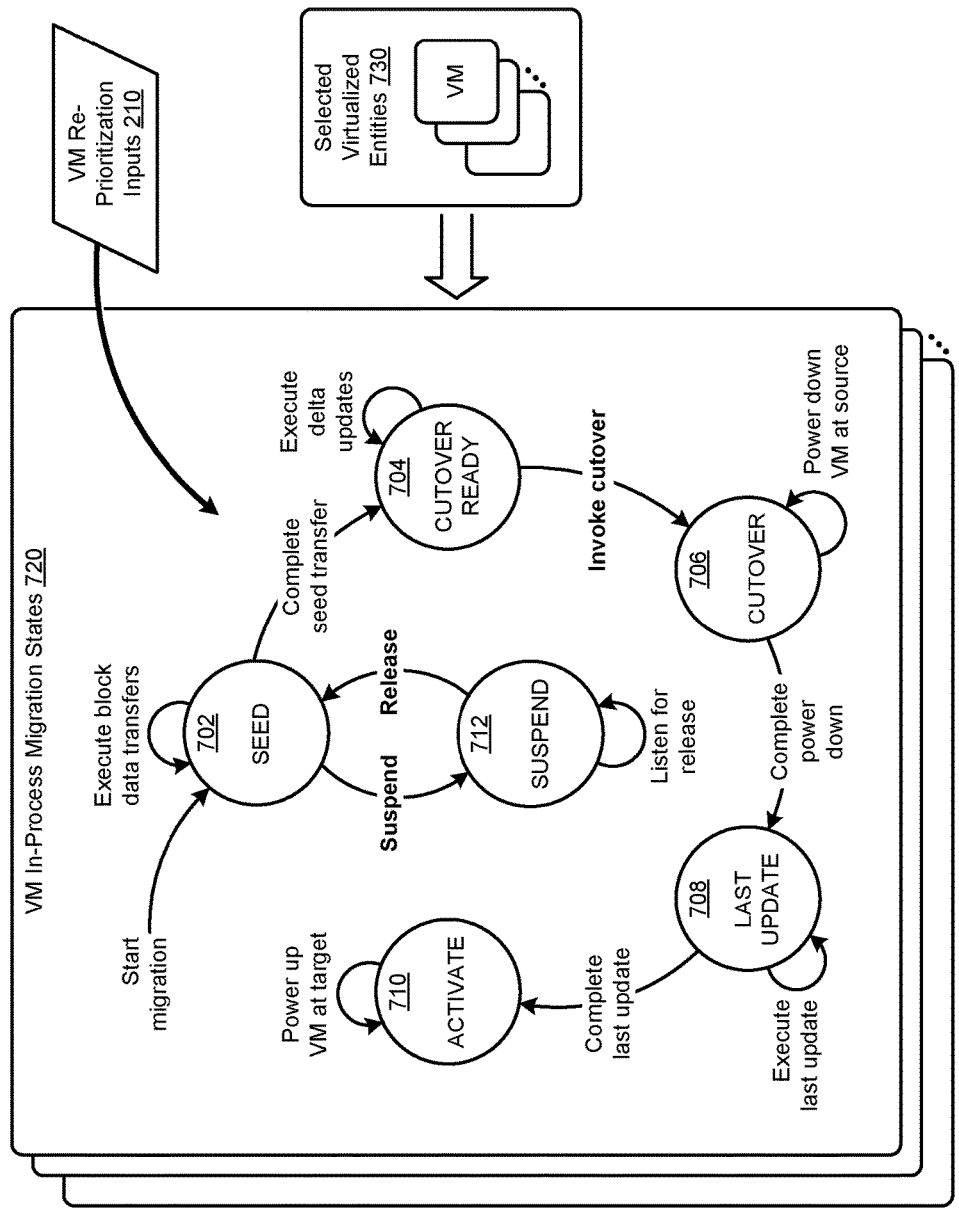
FIG. 7 depicts an in-process migration state modification technique as implemented in systems that facilitate virtual machine re-prioritization during workload migrations between computing environments, according to an embodiment.

FIG. 7 depicts an in-process migration state modification technique 700 as implemented in systems that facilitate virtual machine re-prioritization during workload migrations between computing environments. As an option, one or more variations of in-process migration state modification technique 700 or any aspect thereof may be implemented in the context of the architecture and functionality of the embodiments described herein. The in-process migration state modification technique 700 or any aspect thereof may be implemented in any environment.

FIG. 7 illustrates one aspect pertaining to modifying, in response to VM migration re-prioritization inputs, the in-process migration states of the virtual machines that correspond to a particular workload. Specifically, the figure is being presented to illustrate the set of possible in-process migration states associated with any particular virtualized entity being migrated and how such states are modified (e.g., by a state transition) in response to user inputs received while the migration is in-process.

As shown in FIG. 7, a respective set of VM in-process migration states 720 correspond to each of a set of selected virtualized entities 730 (e.g., VMs) that are selected for migration. The set of VM in-process migration states 720 for each VM of selected virtualized entities 730 comprise six states: a "SEED" state (state 702), a "CUTOVER READY" state (state 704), a "CUTOVER" state (state 706), a "LAST UPDATE" state (state 708), an "ACTIVATE" state (state 710), and a "SUSPEND" state (state 712). In response to a "Start migration" event, a VM enters the "SEED" state, at which state instances of block data transfers will be executed to migrate seed data associated with the VM to the target environment. When the seed transfer is completed, the VM transitions to the "CUTOVER READY" state. In this state, updates (e.g., deltas) to the seed data and/or the then-current migrated data are continually transferred to the target environment.

While the "SEED" state is often the most time-consuming and resource-consuming state, a VM in the "CUTOVER READY" state might be contending with other VMs for computing resources (e.g., other VMs in respective "SEED" states, and/or other VMs that reach "CUTOVER READY" states, etc.), thereby often incurring a long and/or at least uncertain latency before completing its migration (e.g., upon reaching the "ACTIVATE" state). Furthermore, the effects of such uncertain and long cutover latencies are exacerbated when migrating a VM across environments with different hypervisors, since the VM is unavailable (e.g., powered down) during some portions of the cutover. More specifically, when migrating a VM across environments with different hypervisors, the migration includes steps for (1) powering-down the VM so that no further I/Os can be initiated, (2) transferring all of any remaining non-volatile data of a VM to the target environment, and (3) powering-up the VM in the target environment.

This is because a first hypervisor of a first type has a first in-memory data image, while a second hypervisor of a second type has a second in-memory data image that may be incompatible with the first in-memory data image. Such incompatibilities between memory images of different hypervisor types, and/or incompatibilities between virtual entity representations between different hypervisor types introduce complexities in migration. For example, due to differences in data structures and/or device representations between hypervisors, when migrating a VM from one hypervisor type to another hypervisor type, a reboot of the VM might be needed. For example, a hypervisor at a target computing environment might support specialized disk controllers and/or specialized network interfaces that were not present at the source computing environment. As such, migration of a VM to a target computing environment that hosts a hypervisor type that is different from the hypervisor type at the source computing environment might include a reboot of the VM at the target computing environment such that the VM can discover the hardware configuration of the target computing environment during its boot-up and initialization phase.

The herein disclosed techniques address problems attendant to controlling the cutover of VMs while a migration is in-process by modifying one or more of the in-process migration states of the VMs in response to virtual machine re-prioritization inputs. As a representative example illustrated in FIG. 7, one or more instances of virtual machine re-prioritization inputs 210 might request that a subject VM be re-prioritized for cutover above any of the other VMs that are then de-prioritized. In this case, any or all of the de-prioritized VMs are in or enter into the "SEED" state will be transitioned to the "SUSPEND" state (see "Suspend" transition). This state modification will free up computing resources to facilitate the re-prioritized VM to be transitioned to the "CUTOVER" state (see "Invoke cutover" transition). Furthermore, when a VM transitions into the "SUSPEND" state, a listener is invoked to listen for a release signal so as to be able to be released out of the "SUSPEND" state and back into the "SEED" state.

When a power down of the subject VM is initiated, processing within the "CUTOVER" state waits until the VM has completed its power down cycle. In some cases, there may be many tasks to complete in a power down cycle of a VM, and as such a possibly long time (e.g., many seconds) may elapse before achieving a complete power down of the VM. After achieving a complete power down of the VM at the source computing environment, the subject VM transitions to the "LAST UPDATE" state, at which time the last data update (e.g., delta) is transferred to the target computing environment. An instance of the subject VM is then powered up at the target computing environment in the "ACTIVATE" state. In response to the subject VM reaching the "ACTIVATE" state, the other VMs can be transitioned (see "Release" transition) back to the "SEED" state. In most embodiments, change block tracking of the seed data transfer is implemented to facilitate picking up the seed data transfer at the last block transferred prior to being suspended.

A scenario highlighting modification to the in-process migration states of two representative VMs is disclosed in detail as follows.

FIG. 8A through FIG. 8G illustrate an in-process VM migration adjustment scenario 800 as implemented in systems that facilitate virtual machine re-prioritization during workload migrations between computing environments. As an option, one or more variations of in-process VM migration adjustment scenario 800 or any aspect thereof may be implemented in the context of the architecture and functionality of the embodiments described herein. The in-process VM migration adjustment scenario 800 or any aspect thereof may be implemented in any environment.

FIG. 8A through FIG. 8G illustrate one aspect pertaining to modifying, in response to VM migration re-prioritization inputs, the in-process migration states of the virtual machines that correspond to a particular workload. Specifically, the figures illustrate a scenario in which one VM from an in-process migration of a workload is re-prioritized (e.g., for cutover) over another VM from the workload. More specifically, the figures illustrate modifications to the in-process migration states of the VMs to facilitate the re-prioritization.

As shown, the in-process VM migration adjustment scenario 800 pertains to two representative VMs (e.g., VM "vm-4s1" and VM "vm-4sk") of a workload "Workload4" that is selected for migration from a source computing environment to a target computing environment. In each of the figures illustrating the in-process VM migration adjustment scenario 800, an instance of the in-process migration state associated with each VM is depicted. Specifically, in FIG. 8A, a VM in-process migration state $720_{S11}$ associated with VM "vm-4s1" and a VM in-process migration state $720_{SK1}$ associated with VM "vm-4sk" is shown. As can be observed, an operation to start the migration of workload "Workload4" (operation 802) causes both VMs to enter the "SEED" state.

Figure 8A:
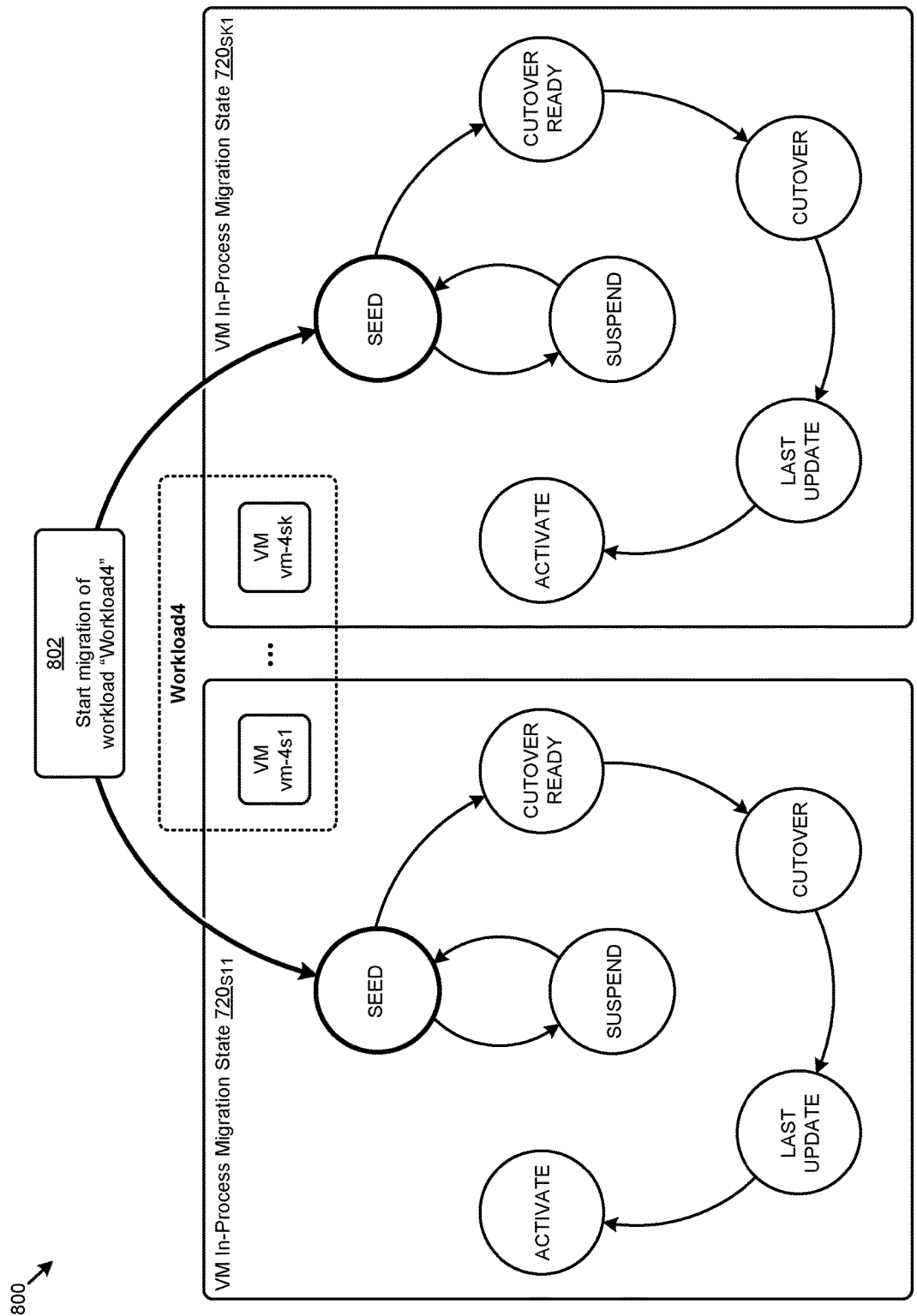
FIG. 8A, FIG. 8B, FIG. 8C, FIG. 8D, FIG. 8E, FIG. 8F, and FIG. 8G illustrate an in-process VM migration adjustment scenario as implemented in systems that facilitate virtual machine re-prioritization during workload migrations between computing environments, according to an embodiment.
Figure 8B:
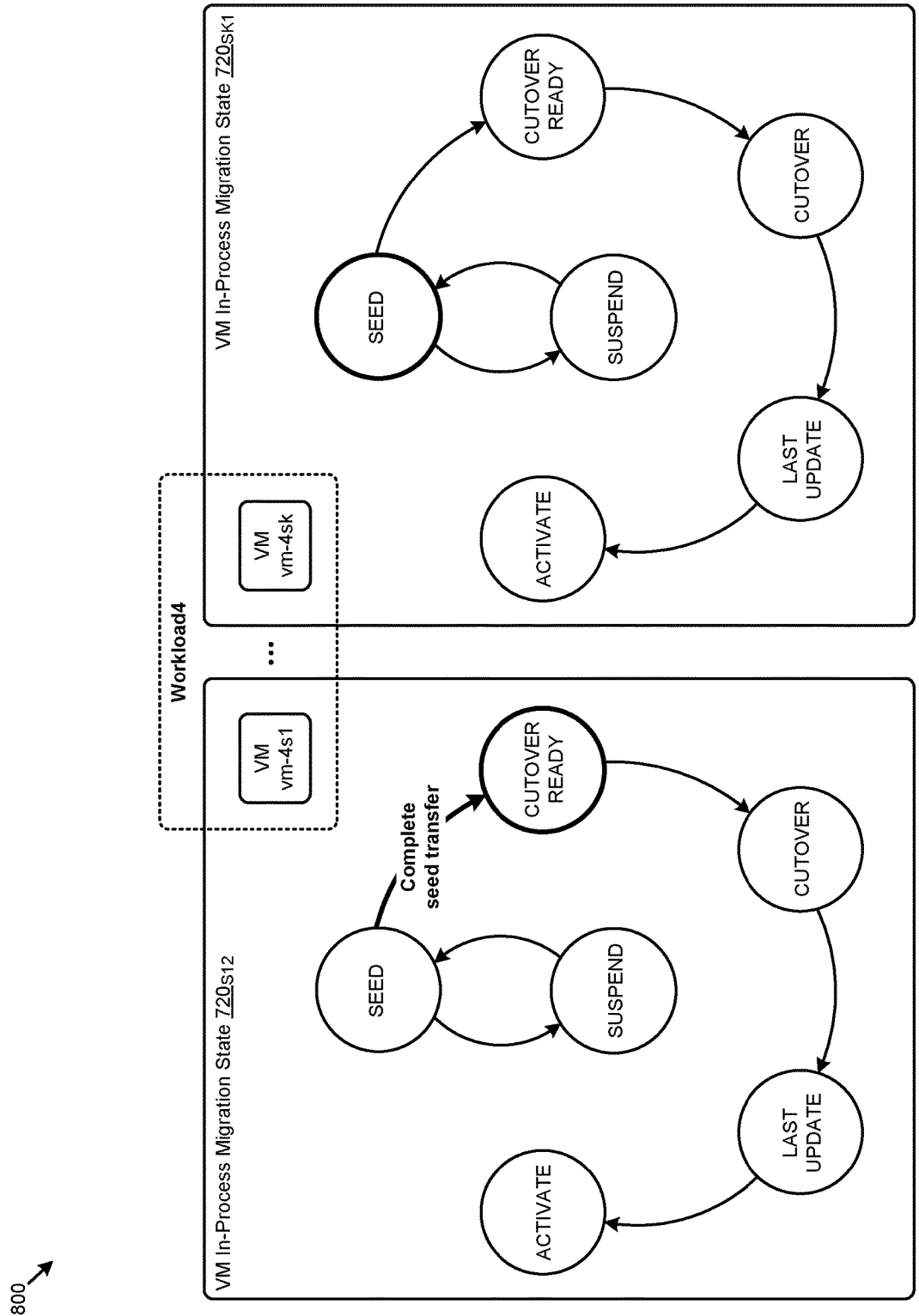
Figure 8C:
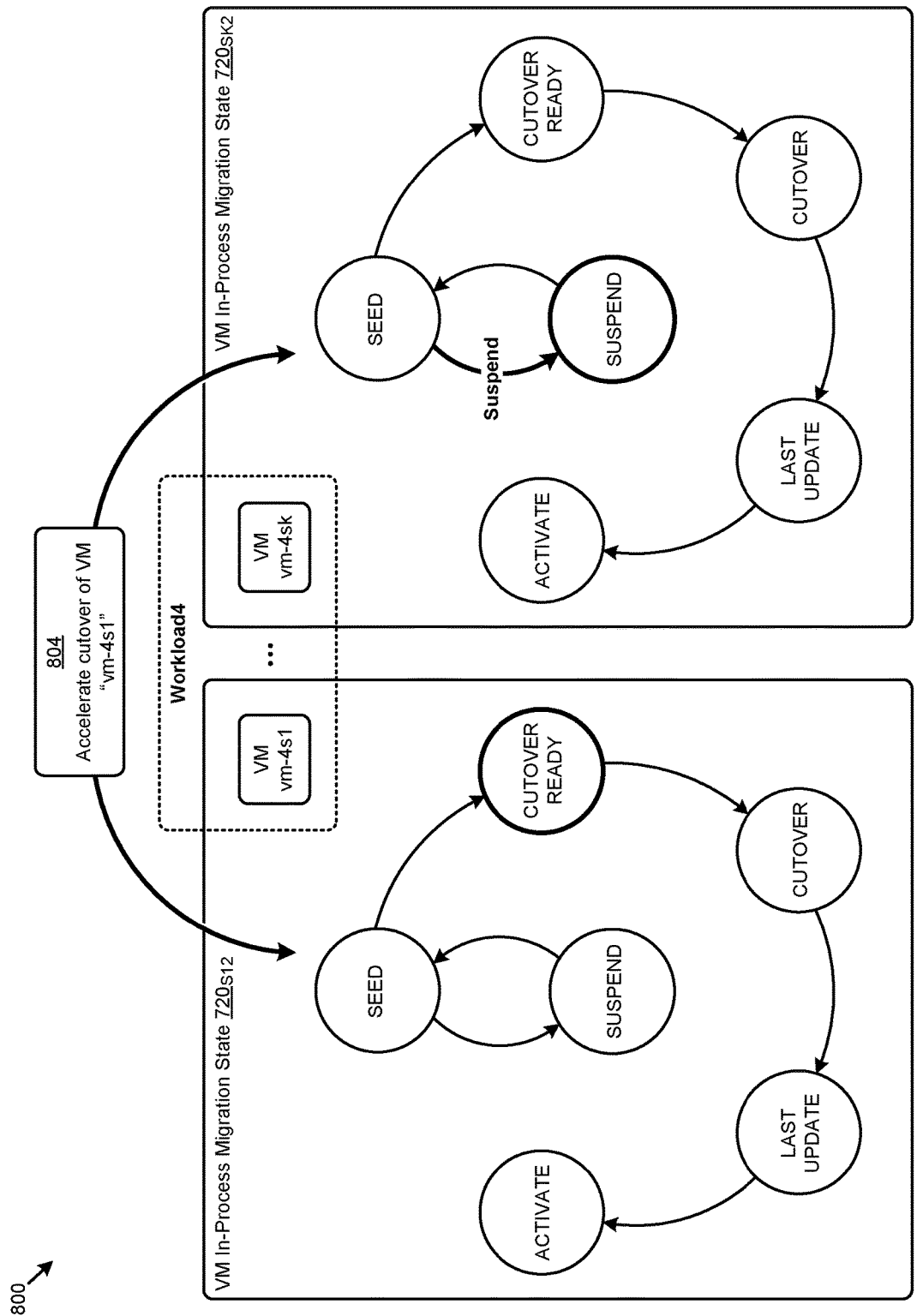
Figure 8D:
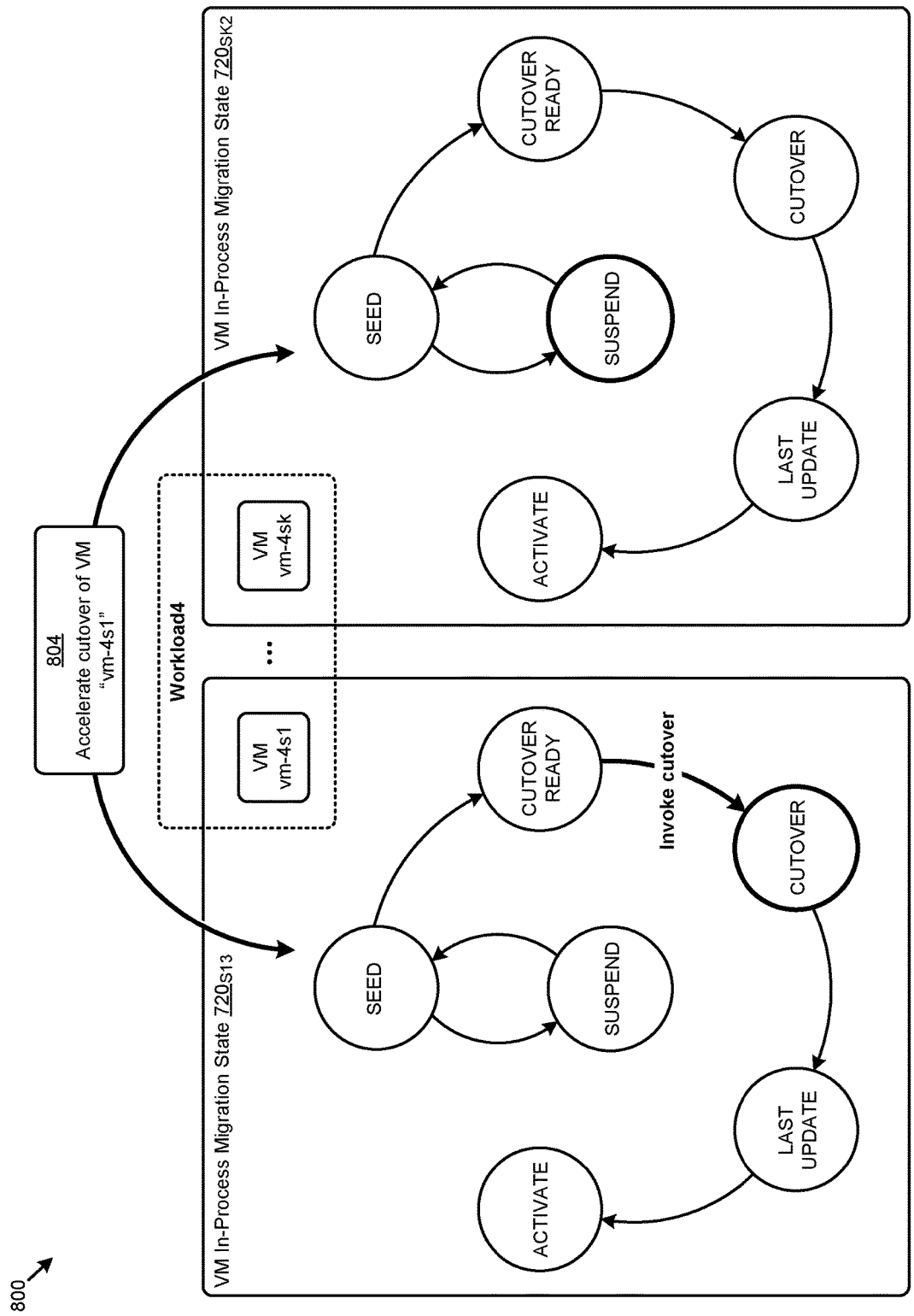
Figure 8E:
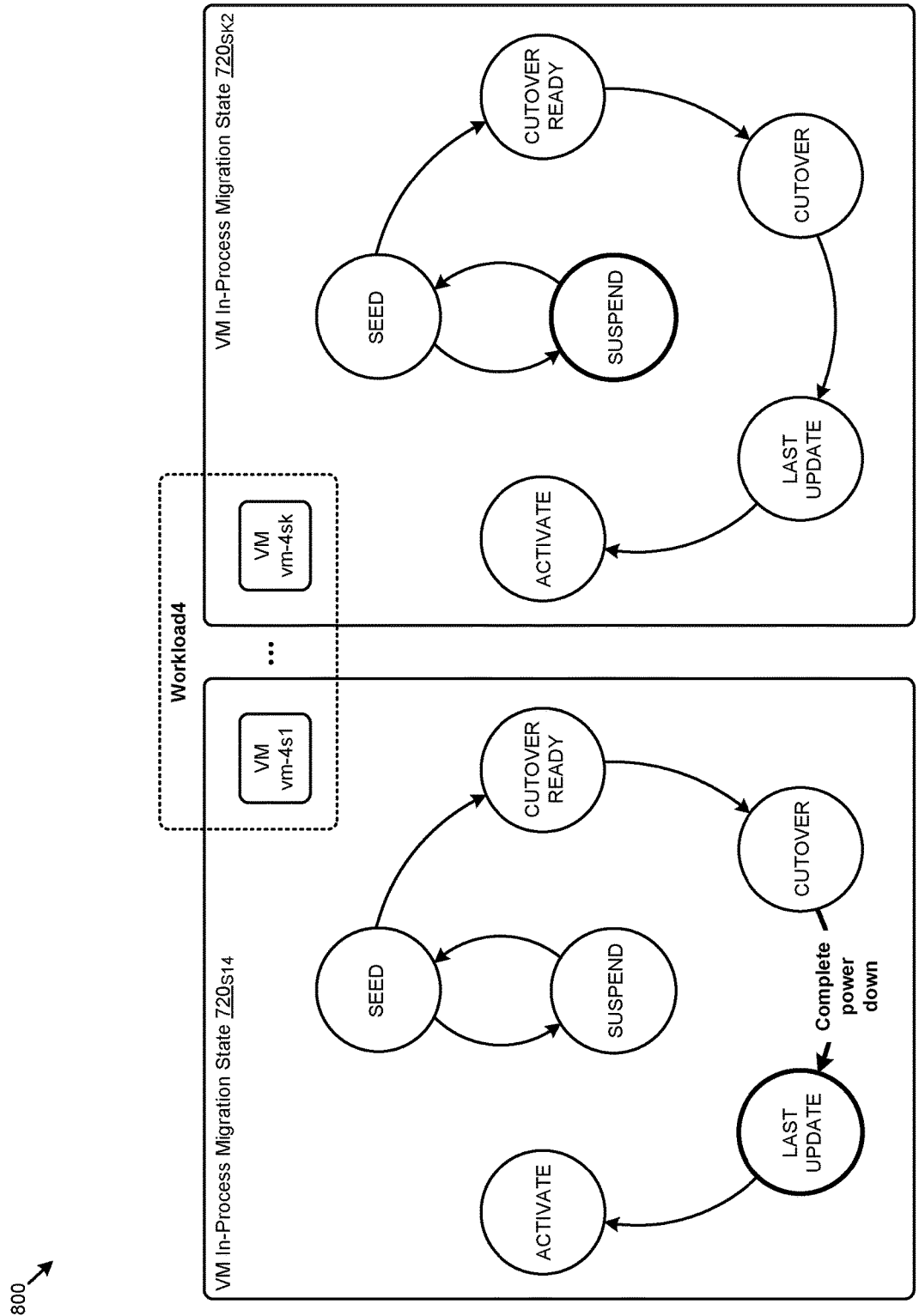
Figure 8F:
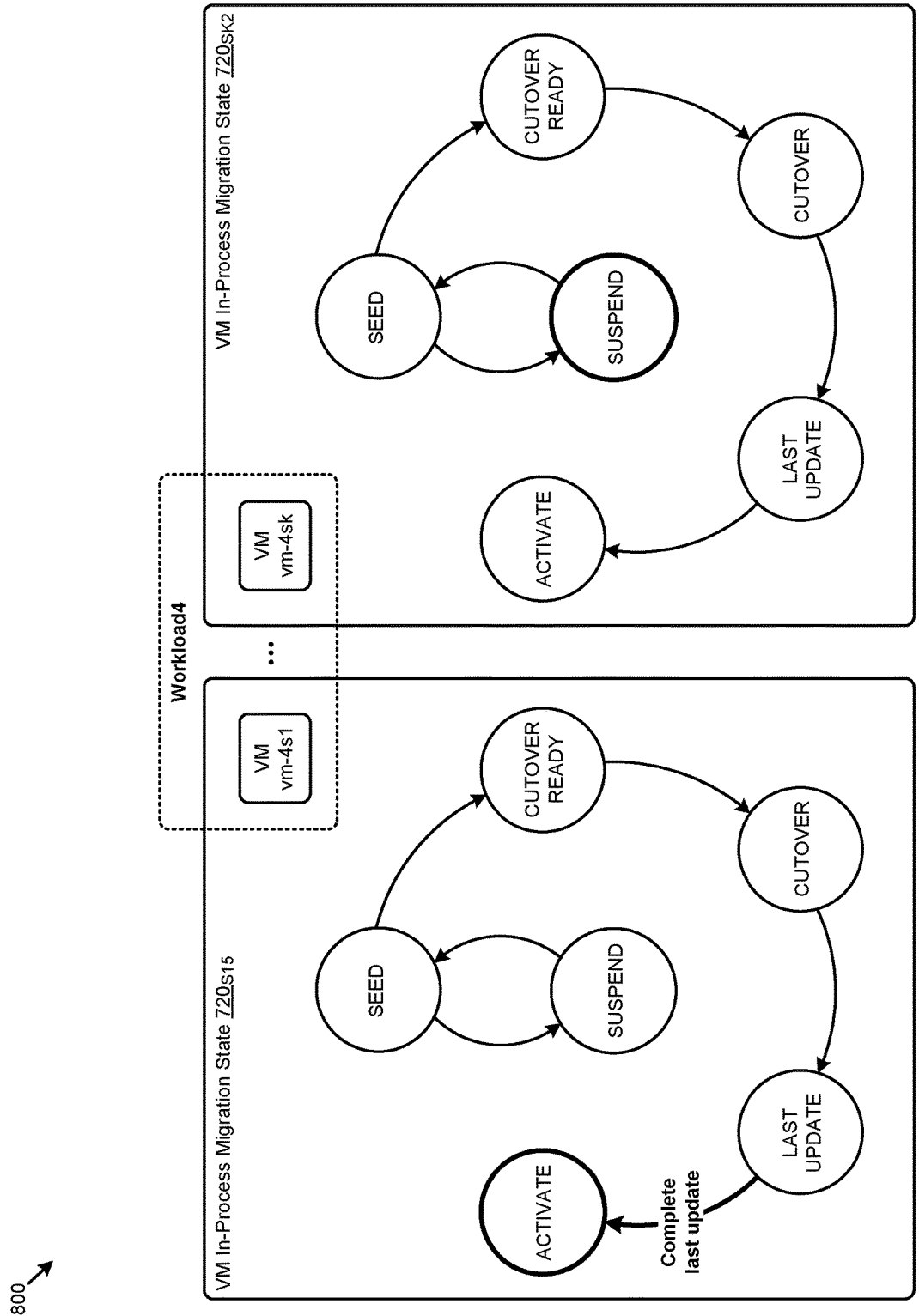
Figure 8G:
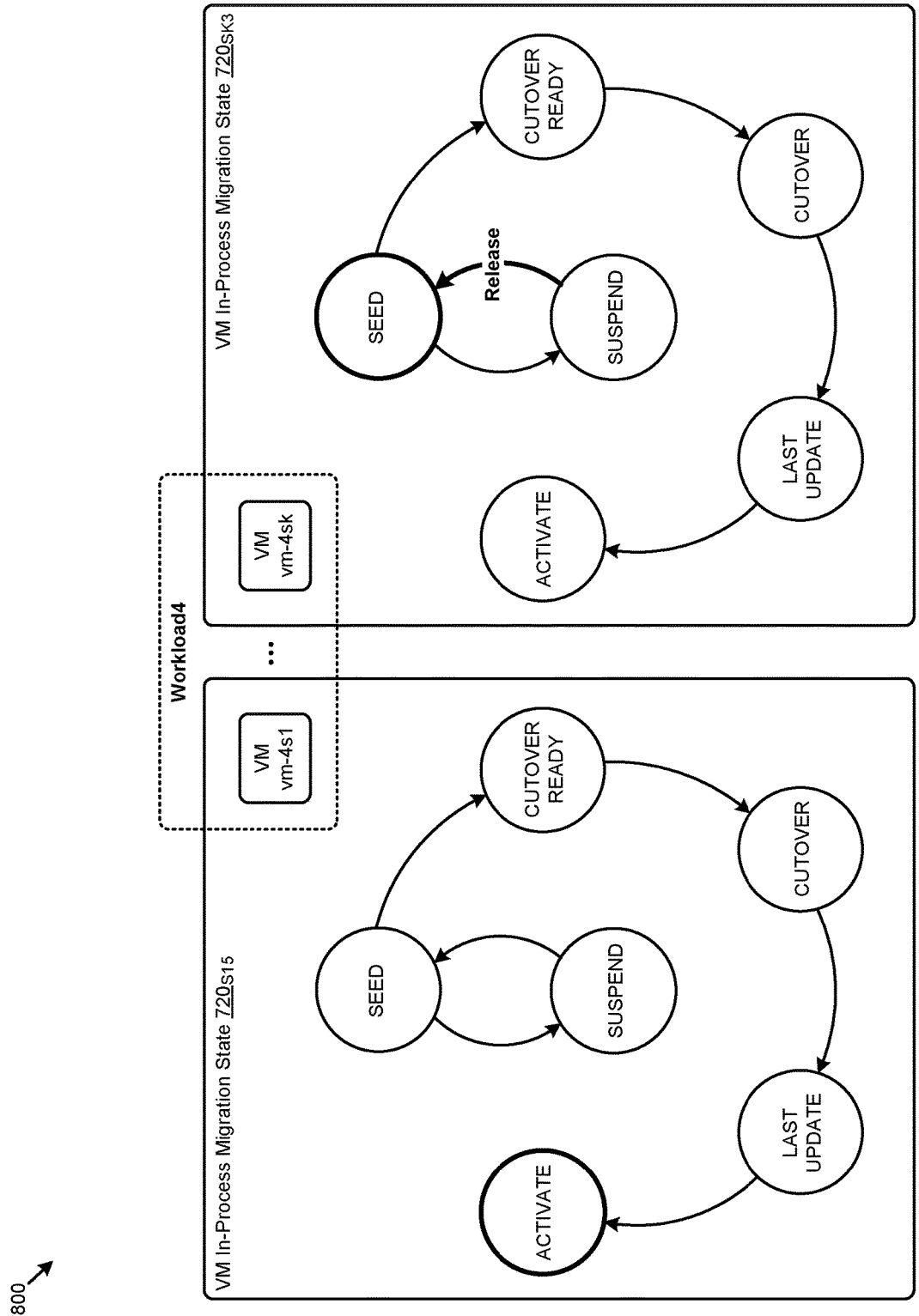

FIG. 8B depicts a VM in-process migration state $720_{S12}$. As shown, the VM "vm-4s1" transitions to the "CUTOVER READY" state ahead of VM "vm-4sk". Referring now to FIG. 8C, in order to mitigate the effects of an uncertain and/or long cutover latency for VM "vm-4s1", a user input that indicates a request to accelerate the cutover of VM "vm-4s1" (operation 804) might be issued (e.g., by an administrator). According to the herein disclosed techniques, such in-process asynchronous inputs can modify one or more in-process migration states to facilitate the desired acceleration. As shown, the VM in-process migration state $720_{SK2}$ associated with VM "vm-4sk" indicates a transition to the "SUSPEND" state in response to the in-process user input. As shown in a VM in-process migration state $720_{S13}$, a VM in-process migration state $720_{S14}$, and a VM in-process migration state $720_{S15}$ of FIG. 8D, FIG. 8E, and FIG. 8F, respectively, VM "vm-4s1" also transitions through the "CUTOVER", "LAST UPDATE", and "ACTIVATE" states in response to the in-process user input. In response VM "vm-4s1" reaching the "ACTIVATE" state, VM "vm-4sk" can be released back to the "SEED" state, as indicated in a VM in-process migration state $720_{SK3}$ of FIG. 8G.

ADDITIONAL EMBODIMENTS OF THE DISCLOSURE

Additional Practical Application Examples

Figure 9:
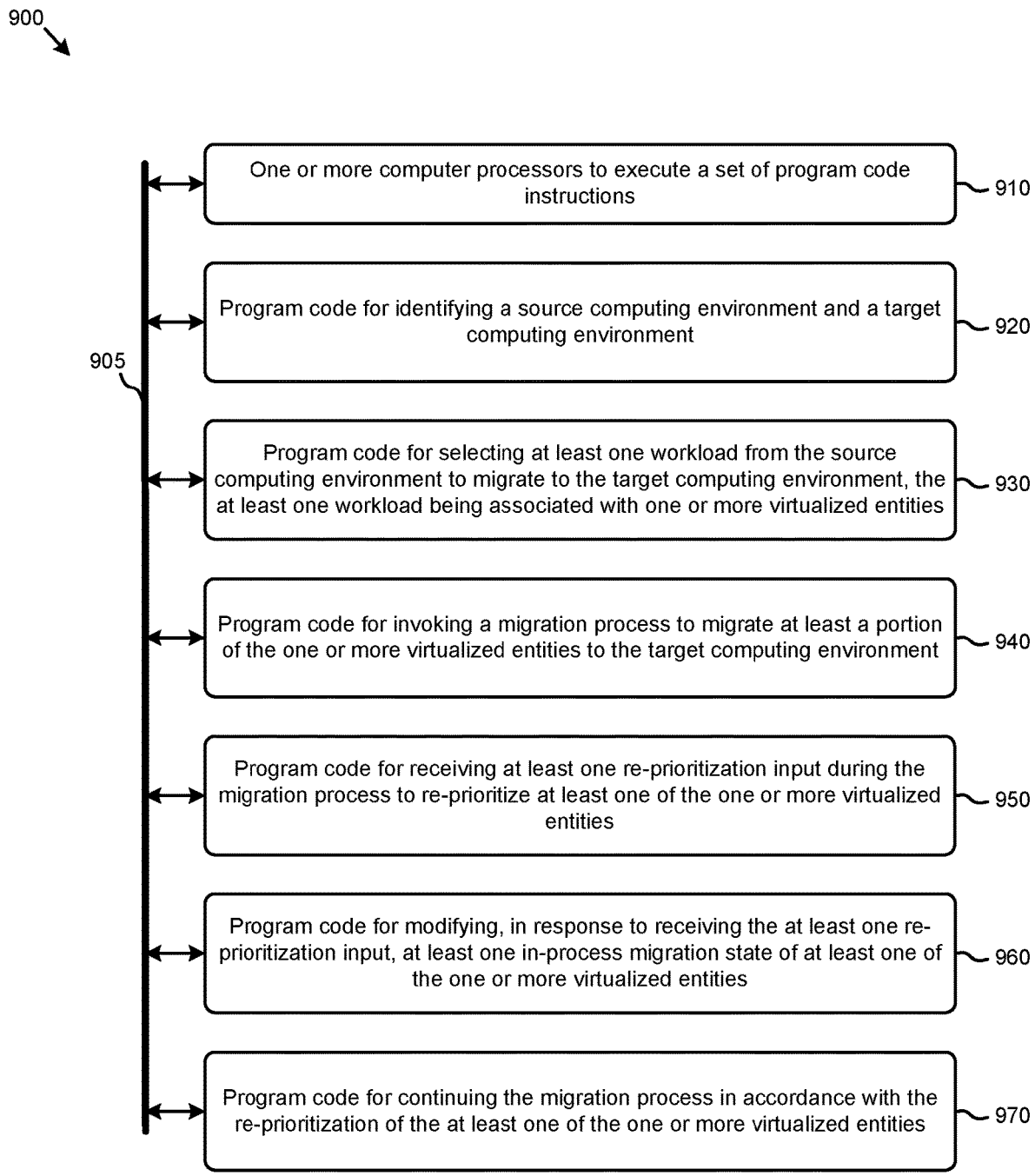
FIG. 9 depicts a system as an arrangement of computing modules that are interconnected so as to operate cooperatively to implement certain of the herein-disclosed embodiments.

FIG. 9 depicts a system 900 as an arrangement of computing modules that are interconnected so as to operate cooperatively to implement certain of the herein-disclosed embodiments. This and other embodiments present particular arrangements of elements that, individually or as combined, serve to form improved technological processes that address controlling the re-prioritization of the migration of a set of virtual machines even after the migration of the virtual machines has commenced. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with any other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising one or more computer processors to execute a set of program code instructions (module 910) and modules for accessing memory to hold program code instructions to perform: identifying a source computing environment and a target computing environment (module 920); selecting at least one workload from the source computing environment to migrate to the target computing environment, the at least one workload being associated with one or more virtualized entities (module 930); invoking a migration process to migrate at least a portion of the one or more virtualized entities to the target computing environment (module 940); receiving at least one re-prioritization input during the migration process to re-prioritize at least one of the one or more virtualized entities (module 950); modifying, in response to receiving the at least one re-prioritization input, at least one in-process migration state of at least one of the one or more virtualized entities (module 960); and continuing the migration process in accordance with the re-prioritization of the at least one of the one or more virtualized entities (module 970).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 10A:
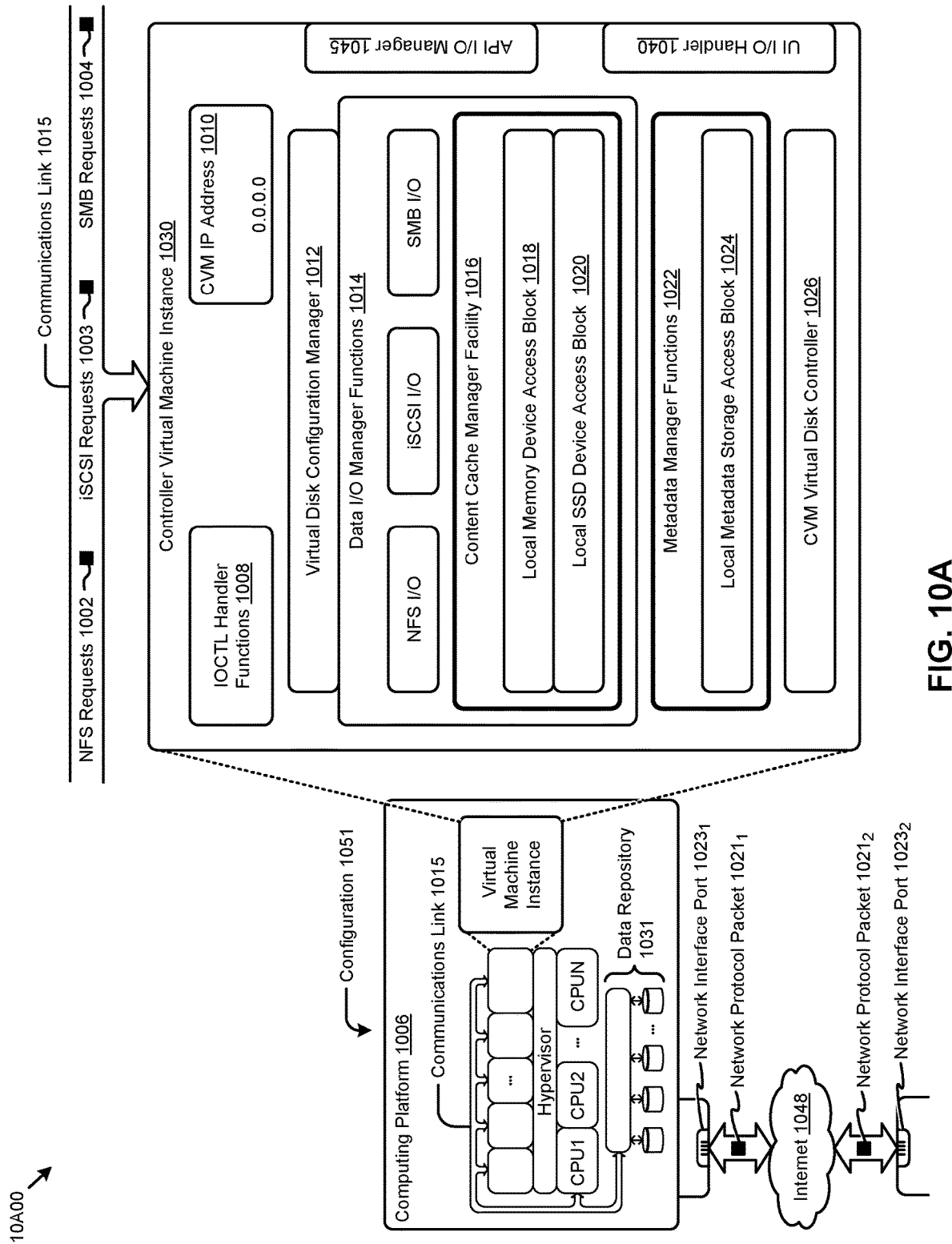
FIG. 10A, FIG. 10B, and FIG. 10C depict virtualized controller architectures comprising collections of interconnected components suitable for implementing embodiments of the present disclosure and/or for use in the herein-described environments.

FIG. 10A depicts a virtualized controller as implemented by the shown virtual machine architecture 10A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 10A00 comprises a collection of interconnected components suitable for implementing embodiments of the present disclosure and/or for use in the herein-described environments. Moreover, virtual machine architecture 10A00 includes a virtual machine instance in configuration 1051 that is further described as pertaining to controller virtual machine instance 1030. Configuration 1051 supports virtual machine instances that are deployed as user virtual machines, or controller virtual machines or both. Such virtual machines interface with a hypervisor (as shown). Some virtual machines include processing of storage I/O (input/output or JO) as received from any or every source within the computing platform. An example implementation of such a virtual machine that processes storage I/O is depicted as 1030.

In this and other configurations, a controller virtual machine instance receives block I/O storage requests as network file system (NFS) requests in the form of NFS requests 1002, and/or internet small computer storage interface (iSCSI) block IO requests in the form of iSCSI requests 1003, and/or Samba file system (SMB) requests in the form of SMB requests 1004. The controller virtual machine (CVM) instance publishes and responds to an internet protocol (IP) address (e.g., CVM IP address 1010). Various forms of input and output can be handled by one or more IO control handler functions (e.g., IOCTL handler functions 1008) that interface to other functions such as data IO manager functions 1014 and/or metadata manager functions 1022. As shown, the data IO manager functions can include communication with virtual disk configuration manager 1012 and/or can include direct or indirect communication with any of various block IO functions (e.g., NFS IO, iSCSI IO, SMB IO, etc.).

In addition to block IO functions, configuration 1051 supports IO of any form (e.g., block IO, streaming IO, packet-based IO, HTTP traffic, etc.) through either or both of a user interface (UI) handler such as UI IO handler 1040 and/or through any of a range of application programming interfaces (APIs), possibly through API IO manager 1045.

Communications link 1015 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 1030 includes content cache manager facility 1016 that accesses storage locations, possibly including local dynamic random access memory (DRAM) (e.g., through local memory device access block 1018) and/or possibly including accesses to local solid state storage (e.g., through local SSD device access block 1020).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 1031, which in turn can be formatted into any one or more storage areas, and which can comprise parameterized storage accessible by a key (e.g., a filename, a table name, a block address, an offset address, etc.). Data repository 1031 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 1024. The data repository 1031 can be configured using CVM virtual disk controller 1026, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 1051 can be coupled by communications link 1015 (e.g., backplane, LAN, PSTN, wired or wireless network, etc.) and each instance may perform respective portions of sequences of instructions as may be required to practice embodiments of the disclosure.

The shown computing platform 1006 is interconnected to the Internet 1048 through one or more network interface ports (e.g., network interface port $1023_1$ and network interface port $1023_2$). Configuration 1051 can be addressed through one or more network interface ports using an IP address. Any operational element within computing platform 1006 can perform sending and receiving operations using any of a range of network protocols, possibly including network protocols that send and receive packets (e.g., network protocol packet $1021_1$ and network protocol packet $1021_2$).

Computing platform 1006 may transmit and receive messages that can be composed of configuration data and/or any other forms of data and/or instructions organized into a data structure (e.g., communications packets). In some cases, the data structure includes program code instructions (e.g., application code) communicated through the Internet 1048 and/or through any one or more instances of communications link 1015. Received program code may be processed and/or executed by a CPU as it is received and/or program code may be stored in any volatile or non-volatile storage for later execution. Program code can be transmitted via an upload (e.g., an upload from an access device over the Internet 1048 to computing platform 1006). Further, program code and/or the results of executing program code can be delivered to a particular user via a download (e.g., a download from computing platform 1006 over the Internet 1048 to an access device).

Configuration 1051 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to virtual machine re-prioritization during workload migrations between computing environments. In some embodiments, a module may include one or more state machines and/or combinational logic used to implement or facilitate the operational and/or performance characteristics pertaining to virtual machine re-prioritization during workload migrations between computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of virtual machine re-prioritization during workload migrations between computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to virtual machine re-prioritization during workload migrations between computing environments, and/or for improving the way data is manipulated when performing computerized operations pertaining to modifying, in response to VM migration re-prioritization inputs, the in-process migration states of the virtual machines that correspond to a particular workload.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 10B:
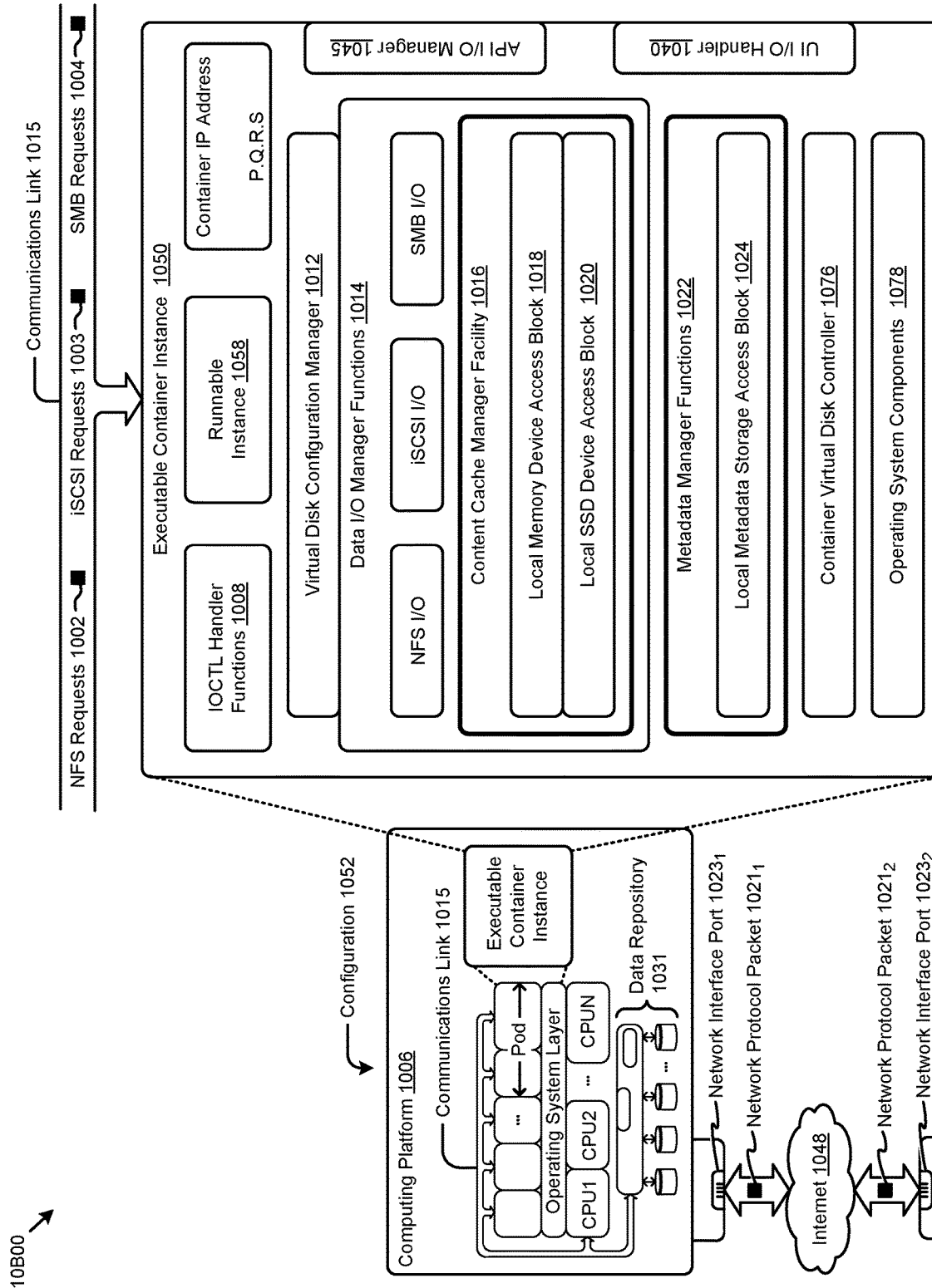

FIG. 10B depicts a virtualized controller implemented by containerized architecture 10B00. The containerized architecture comprises a collection of interconnected components suitable for implementing embodiments of the present disclosure and/or for use in the herein-described environments. Moreover, the shown containerized architecture 10B00 includes an executable container instance in configuration 1052 that is further described as pertaining to executable container instance 1050. Configuration 1052 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 1050). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 1078, however such a separate set of operating system components need not be provided. As an alternative, an executable container can include runnable instance 1058, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1076. Such a container virtual disk controller can perform any of the functions that the aforementioned CVM virtual disk controller 1026 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 10C:
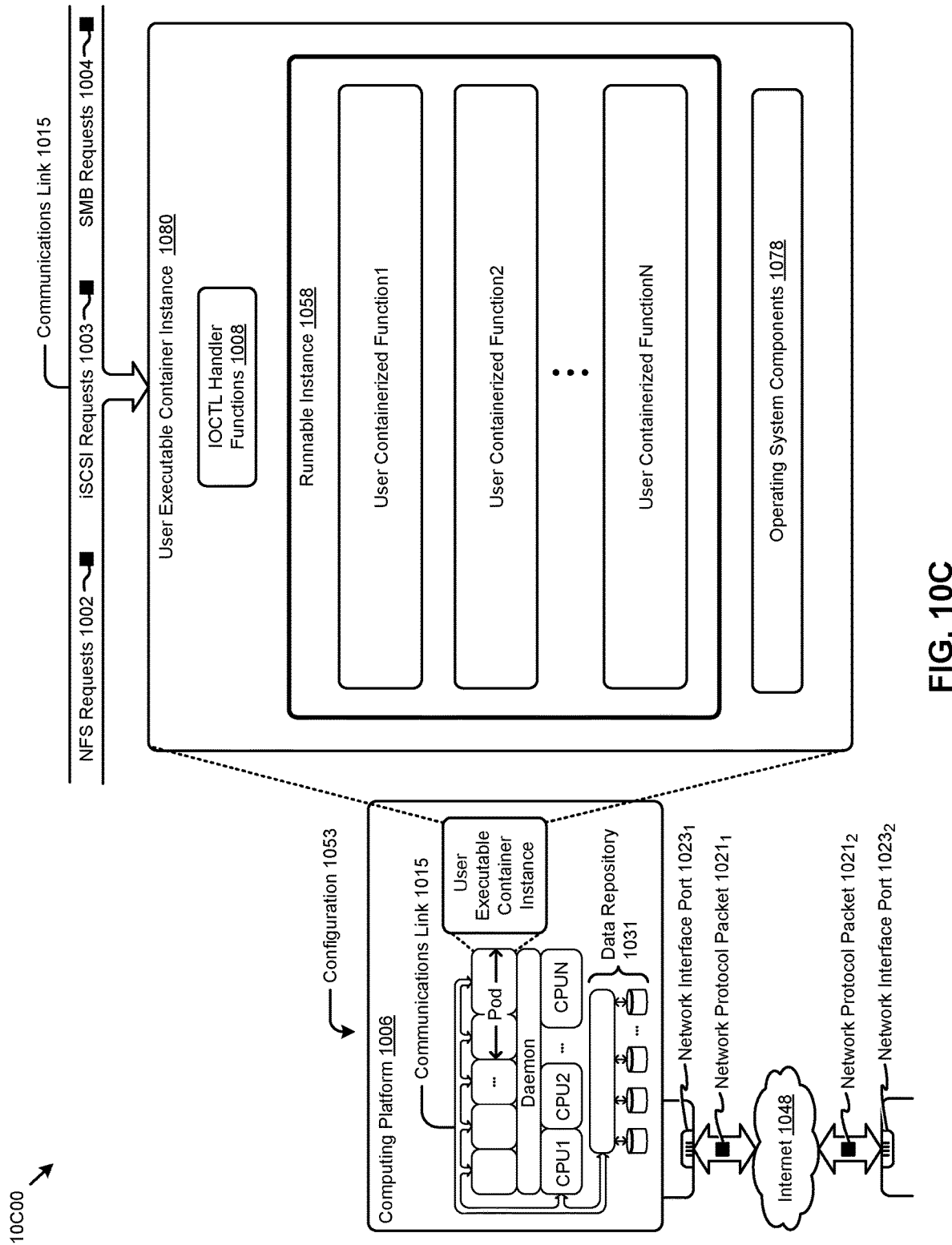

FIG. 10C depicts a virtualized controller implemented by a daemon-assisted containerized architecture 10C00. The containerized architecture comprises a collection of interconnected components suitable for implementing embodiments of the present disclosure and/or for use in the herein-described environments. Moreover, the shown daemon-assisted containerized architecture includes a user executable container instance in configuration 1053 that is further described as pertaining to user executable container instance 1080. Configuration 1053 includes a daemon layer (as shown) that performs certain functions of an operating system.

User executable container instance 1080 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 1058). In some cases, the shown operating system components 1078 comprise portions of an operating system, which portions are interfaced with or included in the runnable instance and/or any user containerized functions. In this embodiment of a daemon-assisted containerized architecture, the computing platform 1006 might or might not host operating system components other than operating system components 1078. More specifically, the shown daemon might or might not host operating system components other than operating system components 1078 of user executable container instance 1080.

The virtual machine architecture 10A00 of FIG. 10A and/or the containerized architecture 10B00 of FIG. 10B and/or the daemon-assisted containerized architecture 10C00 of FIG. 10C can be used in any combination to implement a distributed platform that contains multiple servers and/or nodes that manage multiple tiers of storage where the tiers of storage might be formed using the shown data repository 1031 and/or any forms of network accessible storage. As such, the multiple tiers of storage may include storage that is accessible over communications link 1015. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 1051 of FIG. 10A) to manage the interactions between the underlying hardware and user virtual machines or containers that run client software.

Distinct from user virtual machines or user executable containers, a special controller virtual machine (e.g., as depicted by controller virtual machine instance 1030) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for workload migration control, the method comprising:
    receiving a user input at a user interface that selects a workload to be migrated to a target computing environment, the workload executing on two or more virtual machines;
    invoking a migration process to migrate the two or more virtual machines;
    after the migration process has begun, receiving another user input comprising a re-prioritization input at the user interface, wherein the user interface presents a visual indication that the migration process is already in process and a user selectable element to initiate re-prioritization of a virtual machine of the two or more virtual machines, the re-prioritization is initiated using the user selectable element and the re-prioritization input identifies the virtual machine as a prioritized virtual machine from among the two or more virtual machines; and
    in response to receiving the re-prioritization input, suspending a selected virtual machine while continuing progression of the migration process of the prioritized virtual machine that is not suspended.

2. The method of claim 1, further comprising:
    collecting a source entity attribute from a source computing environment; and
    accessing the source entity attribute to identify a candidate virtual machine to suspend.

3. The method of claim 1, wherein the user interface presents additional visual indications of a number of virtual machines being migrated, an amount of data already migrated, and separately enterable priority values for the two or more virtual machines.

4. The method of claim 1, wherein a source computing environment comprises a first hypervisor type and the target computing environment comprises a second hypervisor type.

5. The method of claim 1, wherein the migration process comprises powering down at least one of the two or more virtual machines.

6. The method of claim 1, further comprising:
    modifying an in-process migration state of the suspended virtual machine.

7. The method of claim 6, wherein the in-process migration state is at least one of, a seed state, a suspended state, a cutover ready state, a cutover state, a last update state, or an activate state.

8. The method of claim 6, wherein modifying the in-process migration state causes a state transition between any of, a seed state, a suspended state, a cutover ready state, a cutover state, a last update state, or an activate state.

9. The method of claim 1, wherein the workload comprises a virtual machine, a virtual disk, or an executable container.

10. A non-transitory computer readable medium having stored thereon a sequence of instructions which, when executed by a processor causes a set of acts for workload migration control, the set of acts comprising:
    receiving a user input at a user interface that selects a workload to be migrated to a target computing environment, the workload executing on two or more virtual machines;
    invoking a migration process to migrate the two or more virtual machines;
    after the migration process has begun, receiving another user input comprising a re-prioritization input at the user interface, wherein the user interface presents a visual indication that the migration process is already in process and a user selectable element to initiate re-prioritization of a virtual machine of the two or more virtual machines, the re-prioritization is initiated using the user selectable element and the re-prioritization input identifies the virtual machine as a prioritized virtual machine from among the two or more virtual machines; and
    in response to receiving the re-prioritization input, suspending a selected virtual machine while continuing progression of the migration process of the prioritized virtual machine that is not suspended.

11. The computer readable medium of claim 10, further comprising instructions which, when stored in memory and executed by the processor causes the processor to perform acts of:
    collecting one or more source entity attributes from a source computing environment; and
    accessing the one or more source entity attributes to identify a plurality of candidate virtual machines to suspend.

12. The computer readable medium of claim 10, wherein the user interface presents additional visual indications of a number of virtual machines being migrated, an amount of data already migrated, and separately enterable priority values for the two or more virtual machines.

13. The computer readable medium of claim 10, wherein a source computing environment comprises a first hypervisor type and the target computing environment comprises a second hypervisor type.

14. The computer readable medium of claim 10, wherein the migration process comprises powering down at least one of the two or more virtual machines.

15. The computer readable medium of claim 10, further comprising instructions which, when stored in memory and executed by the processor causes the processor to perform acts of:
    modifying an in-process migration state of the suspended virtual machine.

16. The computer readable medium of claim 15, wherein the in-process migration state is at least one of, a seed state, a suspended state, a cutover ready state, a cutover state, a last update state, or an activate state.

17. The computer readable medium of claim 15, wherein modifying the in-process migration state causes at least one state transition between any of, a seed state, a suspended state, a cutover ready state, a cutover state, a last update state, or an activate state.

18. The computer readable medium of claim 10, wherein the workload comprises a virtual machine, a virtual disk, or an executable container.

19. A system for workload migration control, the system comprising:
    a storage medium having stored thereon a sequence of instructions; and
    a processor that execute the sequence of instructions to cause the processor to perform a set of acts, the set of acts comprising,
        receiving a user input at a user interface that selects a workload to be migrated to a target computing environment, the workload executing on two or more virtual machines;
        invoking a migration process to migrate the two or more virtual machines;
        after the migration process has begun, receiving another user input comprising a re-prioritization input at the user interface, wherein the user interface presents a visual indication that the migration process is already in process and a user selectable element to initiate re-prioritization of a virtual machine of the two or more virtual machines, the re-prioritization is initiated using the user selectable element and the re-prioritization input identifies the virtual machine as a prioritized virtual machine from among the two or more virtual machines; and
        in response to receiving the re-prioritization input, suspending a selected virtual machine while continuing progression of the migration process of the prioritized virtual machine that is not suspended.

20. The system of claim 19, where the set of acts further comprise modifying an in-process migration state of the suspended virtual machine.

21. The system of claim 19, wherein a source computing environment comprises a first hypervisor type and the target computing environment comprises a second hypervisor type.

22. The system of claim 19, wherein the set of acts further comprise collecting a source entity attribute from the source computing environment and accessing the source entity attribute to identify a candidate virtual machine to suspend.

23. The system of claim 19, wherein the migration process comprises powering down at least one of the two or more virtual machines.

* * * * *